United States Patent
Roidl et al.

(10) Patent No.: US 11,987,008 B2
(45) Date of Patent: May 21, 2024

(54) IRRADIATION SEQUENCES FOR CONSOLIDATING POWDER MATERIAL IN AN ADDITIVE MANUFACTURING MACHINE

(71) Applicants: General Electric Company, Schenectady, NY (US); Concept Laser GmbH, Lichtenfels (DE); GE Additive Germany GmbH, Frankfurt am Main (DE)

(72) Inventors: Benedikt Roidl, Gräfelfing (DE); Kishore Ramakrishnan, Rexford, NY (US); Changjin Yoon, Schenectady, NY (US); Andrey I. Meshkov, Niskayuna, NY (US); Peter Pontiller-Schymura, Kulmbach (DE)

(73) Assignees: General Electric Company, Schenectady, NY (US); Concept Laser GmbH, Lichtenfels (DE); GE Additive Germany GmbH, Frankfurt am Main (DE)

( * ) Notice: Subject to any disclaimer, the term of this patent is extended or adjusted under 35 U.S.C. 154(b) by 13 days.

(21) Appl. No.: 17/573,068

(22) Filed: Jan. 11, 2022

(65) Prior Publication Data
US 2023/0219298 A1    Jul. 13, 2023

(51) Int. Cl.
*B29C 64/393* (2017.01)
*B22F 10/28* (2021.01)
(Continued)

(52) U.S. Cl.
CPC ............ *B29C 64/393* (2017.08); *B22F 10/28* (2021.01); *B22F 10/366* (2021.01); *B22F 12/45* (2021.01);
(Continued)

(58) Field of Classification Search
CPC ... B29C 64/393; B29C 64/153; B29C 64/268; B29C 64/277; B29C 64/386; B22F 10/28;
(Continued)

(56) References Cited

U.S. PATENT DOCUMENTS

| 10,926,469 B2 | 2/2021 | Amaya et al. |
| 2010/0044547 A1* | 2/2010 | Higashi ................. B29C 64/153 425/78 |

(Continued)

FOREIGN PATENT DOCUMENTS

| CN | 110605393 A | 12/2019 |
| DE | 102017108534 | 10/2018 |

(Continued)

*Primary Examiner* — Michael J Brown
(74) *Attorney, Agent, or Firm* — Dority & Manning, P.A.

(57) ABSTRACT

A method of additively manufacturing a three-dimensional object may be performed using an irradiation sequence that is based at least in part on a predicted location of one or more fume plumes emitted from the powder material when irradiated by a plurality of energy beams. An exemplary method may include determining, with a computing device, an irradiation sequence for selectively consolidating powder material using an energy beam system of an additive manufacturing machine, and providing control commands, from the computing device to the energy beam system, configured to cause the energy beam system to emit a plurality of energy beams to selectively consolidate the powder material.

19 Claims, 19 Drawing Sheets

(51) Int. Cl.
*B22F 10/366* (2021.01)
*B22F 12/45* (2021.01)
*B28B 1/00* (2006.01)
*B28B 17/00* (2006.01)
*B29C 64/153* (2017.01)
*B29C 64/268* (2017.01)
*B29C 64/277* (2017.01)
*B33Y 10/00* (2015.01)
*B33Y 30/00* (2015.01)
*B33Y 50/02* (2015.01)
*B22F 10/80* (2021.01)

(52) U.S. Cl.
CPC .......... *B28B 1/001* (2013.01); *B28B 17/0081* (2013.01); *B29C 64/153* (2017.08); *B29C 64/268* (2017.08); *B29C 64/277* (2017.08); *B33Y 10/00* (2014.12); *B33Y 30/00* (2014.12); *B33Y 50/02* (2014.12)

(58) Field of Classification Search
CPC ........ B22F 10/366; B22F 12/45; B22F 10/31; B22F 10/322; B22F 10/36; B22F 10/38; B22F 10/80; B22F 10/85; B22F 12/90; B28B 1/001; B28B 17/0081; B33Y 10/00; B33Y 30/00; B33Y 50/02; B33Y 50/00; Y02P 10/25

USPC ....................................................... 700/119
See application file for complete search history.

(56) References Cited

U.S. PATENT DOCUMENTS

| | | |
|---|---|---|
| 2016/0279707 A1 | 9/2016 | Mattes et al. |
| 2018/0043432 A1 | 2/2018 | Domrose |
| 2018/0178284 A1 | 6/2018 | Martin et al. |
| 2018/0178287 A1 | 6/2018 | Mamrak et al. |
| 2018/0272611 A1 | 9/2018 | Cantzler et al. |
| 2019/0389137 A1 | 12/2019 | Frohnmaier et al. |
| 2020/0061710 A1 | 2/2020 | Nassar et al. |
| 2022/0023949 A1* | 1/2022 | Araie ................ B22F 12/45 |
| 2022/0193769 A1* | 6/2022 | Hoppe ............... B22F 10/322 |

FOREIGN PATENT DOCUMENTS

| | | |
|---|---|---|
| EP | 3079912 A1 | 10/2016 |
| EP | 3272505 A1 | 1/2018 |
| EP | 3558637 A1 | 10/2019 |
| WO | WO2018/192763 A1 | 10/2018 |

* cited by examiner

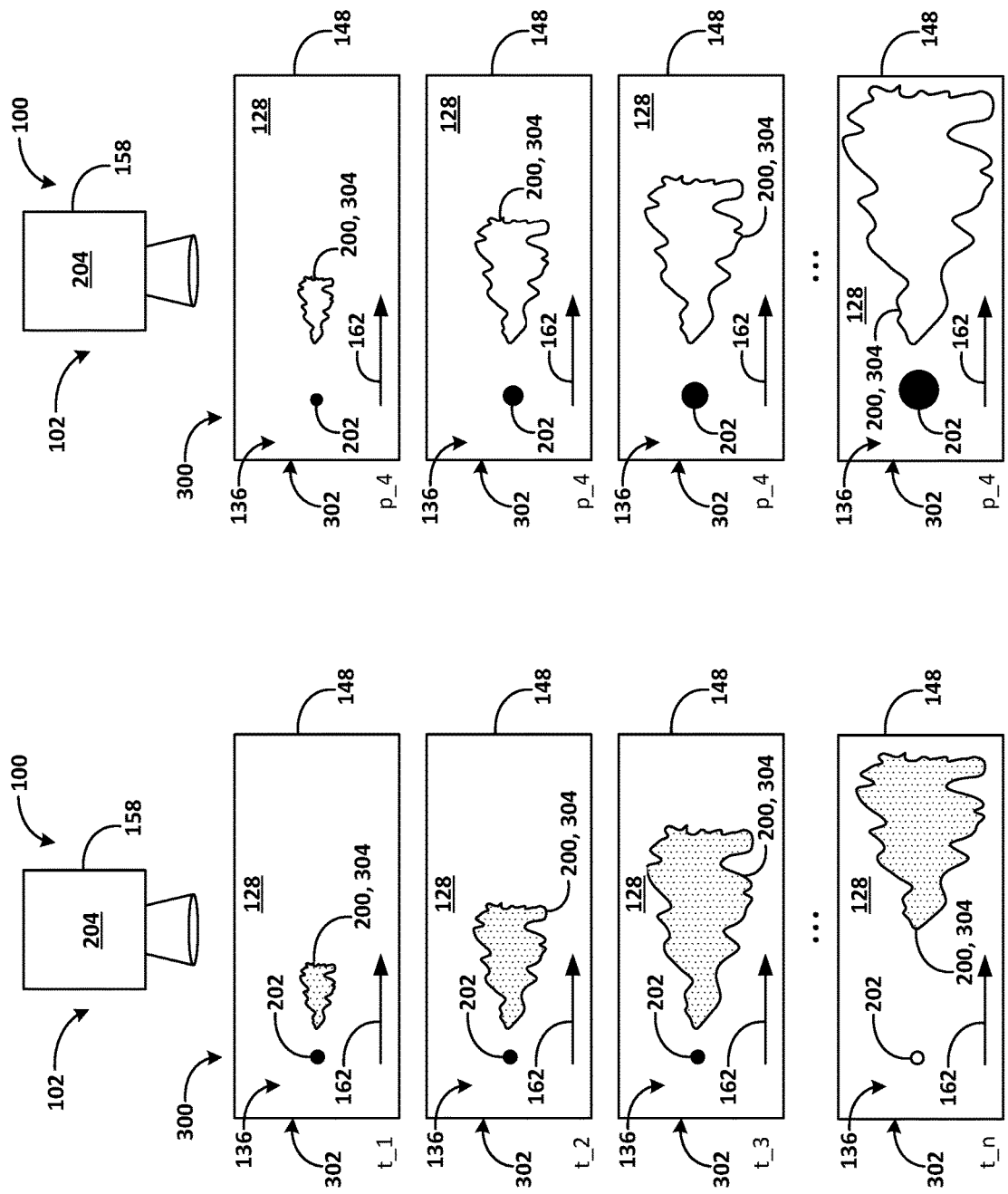

FIG. 4B

IRRADIATION SEQUENCES FOR CONSOLIDATING POWDER MATERIAL IN AN ADDITIVE MANUFACTURING MACHINE

FIELD

The present disclosure generally pertains to methods of additively manufacturing three-dimensional objects, and more particularly to irradiation sequences for selectively consolidating powder material to form three-dimensional objects, such as in a powder bed fusion process.

BACKGROUND

Three dimensional objects may be additively manufactured using a powder bed fusion process in which one or more energy beams are directed onto a powder bed to consolidate (e.g., melt and/or sinter) sequential layers of powder material. The properties of the three-dimensional objects formed by consolidating the powder material may depend at least in part on the irradiation sequence utilized to selectively consolidate the powder material. Additionally, or in the alternative, one or more parameters pertaining to operating efficiency of an additive manufacturing machine may depend at least in part on the irradiation sequence used. Accordingly, it would be welcomed in the art to provide improved methods of additively manufacturing three-dimensional objects, including improved irradiation sequences for selectively consolidating powder material to form three-dimensional objects.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 3A-3D schematically depict exemplary image data representing a fume plume corresponding to respectively different process conditions;

FIGS. 4A-4D respectively show a correlation between a region of a build plane occluded by a fume plume and one or more process conditions associated with an additive manufacturing machine;

Figure 1:
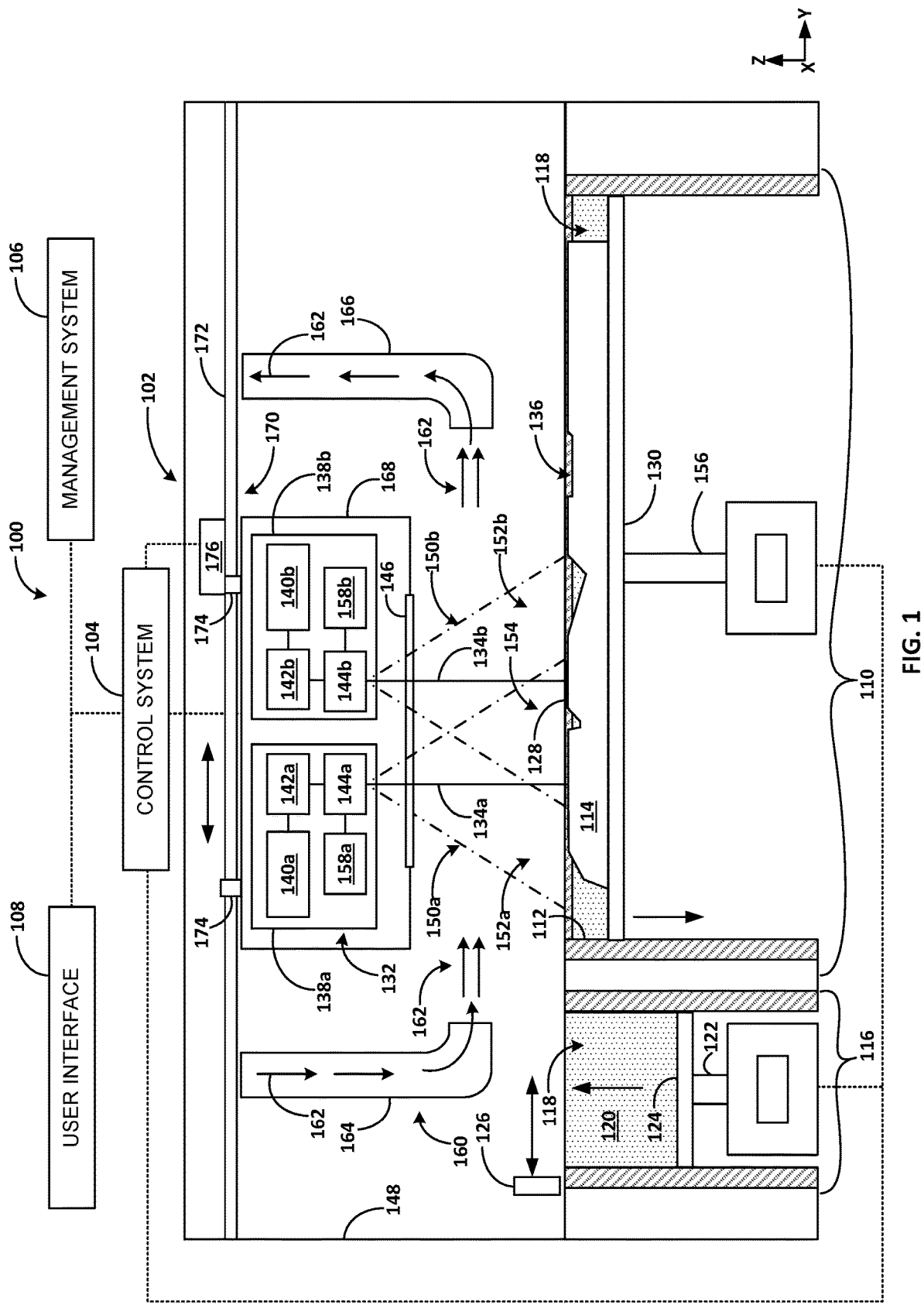
FIG. 1 schematically depicts an exemplary additive manufacturing system or machine.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, and other additive manufacturing technologies that utilize an energy beam or other energy source to solidify an additive manufacturing material such as a powder material. In fact, any suitable additive manufacturing modality may be utilized with the presently disclosed the subject matter.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, or any other suitable material that may be in solid, powder, sheet material, wire, or any other suitable form, or combinations thereof. Additionally, or in the alternative, exemplary materials may include metals, ceramics, or binders, as well as combinations thereof. Exemplary ceramics may include ultra-high-temperature ceramics, and/or precursors for ultra-high-temperature ceramics, such as polymeric precursors. Each successive layer may be, for example, between about 10 μm and 200 μm, although the thickness may be determined based on any number of parameters and may be any suitable size.

The present disclosure generally provides systems and methods of additively manufacturing three-dimensional objects using an additive manufacturing machine. In accordance with the present disclosure, an irradiation sequence may be determined for one or more energy beams used to selectively irradiate and thereby consolidate powder material to form respective layers of a three-dimensional object. When irradiating the powder material, fumes may be emitted from the powder material as a result of energy imparted to the powder material. The fumes may generally be emitted in the form of a plume that may be visible and or detectable by a camera or imaging device. The fumes may include gaseous and/or particulate materials associated with the additive manufacturing process, such as powder material, dust, soot, residues, vapors, splatter particles, byproducts, and the like. Generally, a flow of inert process gas is sustained through a process chamber of an additive manufacturing machine to remove such fumes from the process chamber, as such fumes may cause scattering of an energy beam, which, in turn, may adversely affect the properties of the energy beam incident upon the build plane and resulting consolidation of the powder material.

The present disclosure advantageously provides systems and methods of determining predicted locations of fume plumes respectively generated by one or more energy beams, as well as systems and methods of determining an irradiation sequence for the one or more energy beam that avoids the predicted locations of such fume plumes. The present disclosure also provides systems and methods of determining an irradiation sequence that provides for improved energy beam utilization, including, for example, increased proportion of time when the one or more energy beams are concurrently irradiating the powder bed and/or improved balance of energy between respective ones of a plurality of energy beams. Such improved energy beam utilization may be provided while also avoiding the predicted locations of such fume plumes generated by the one or more energy beam. The presently disclosed systems and methods may provide for improved productivity, for example, as a result of improved energy beam utilization. Additionally, or in the alternative, presently disclosed systems and methods may provide for improved material properties of additively-manufactured three-dimensional objects, for example, as a result of avoiding interactions between energy beams and fumes emitted from the powder material.

As used herein, the term "build plane" refers to a plane defined by a surface upon which an energy beam impinges to selectively irradiate and thereby consolidate powder material during an additive manufacturing process. Generally, the surface of a powder bed defines the build plane. During irradiation of a respective layer of the powder bed, a previously irradiated portion of the respective layer may define a portion of the build plane. Prior to distributing powder material across a build module, a build plate that supports the powder bed generally defines the build plane.

As used herein, the term "consolidate" or "consolidating" refers to solidification of powder material as a result of irradiating the powder material, including by way of melting, fusing, sintering, or the like.

It is understood that terms "upstream" and "downstream" refer to the relative direction with respect to fluid flow in a fluid pathway. For example, "upstream" refers to the direction from which the fluid flows, and "downstream" refers to the direction to which the fluid flows.

It is also understood that terms such as "top", "bottom", "outward", "inward", and the like are words of convenience and are not to be construed as limiting terms.

As used herein, the terms "first", "second", and "third" may be used interchangeably to distinguish one component from another and are not intended to signify location or importance of the individual components.

The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The presently disclosed subject matter will now be described in further detail. FIG. 1 schematically depicts an exemplary additive manufacturing system 100. The additive manufacturing system 100 may include one or more additive manufacturing machines 102. It will be appreciated that the additive manufacturing system 100 and additive manufacturing machine 102 shown in FIG. 1 is provided by way of example and not to be limiting. In fact, the subject matter of the present disclosure may be practiced with any suitable additive manufacturing system 100 and machine 102 without departing from the scope of the present disclosure. As shown, the one or more additive manufacturing machines 102 may include a control system 104. The control system 104 may be included as part of the additive manufacturing machine 102 or the control system 104 may be associated with the additive manufacturing machine 102. The control system 104 may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or objects 114 may be additively manufactured. An additive manufacturing machine 102 may include a powder module 116 that contains a supply of powder material 118 housed within a supply chamber 120. The build module 110 and/or the powder module 116 may be provided in the form of modular containers configured to be installed into and removed from the additive manufacturing machine 102 such as in an assembly-line process. Additionally, or in the alternative, the build module 110 and/or the powder module 116 may define a fixed componentry of the additive manufacturing machine 102.

The powder module 116 contains a supply of powder material 118 housed within a supply chamber 120. The powder module 116 includes a powder piston 122 that elevates a powder floor 124 during operation of the additive manufacturing machine 102. As the powder floor 124 elevates, a portion of the powder material 118 is forced out of the powder module 116. A recoater 126 such as a blade or roller sequentially distributes thin layers of powder material 118 across a build plane 128 above the build module 110. A build platform 130 supports the sequential layers of powder material 118 distributed across the build plane 128. A build platform 130 may include a build plate (not shown) secured thereto and upon which an object 114 may be additively manufactured.

The additive manufacturing machine 102 includes an energy beam system 132 configured to generate one or more of energy beams 134 and to direct the respective energy beams 134 onto the build plane 128 to selectively solidify respective portions of the powder bed 136 defining the build plane 128. The energy beams 134 may be laser beams or beams from any other suitable energy source, such as LEDs or other light sources, and so forth. As the respective energy beams 134 selectively melt or fuse the sequential layers of powder material 118 that define the powder bed 136, the object 114 begins to take shape. The one or more energy beams 134 or laser beams may include electromagnetic radiation having any suitable wavelength or wavelength range, such as a wavelength or wavelength range corresponding to infrared light, visible light, and/or ultraviolet light.

Typically, with a DMLM, EBM, or SLM system, the powder material 118 is fully melted, with respective layers being melted or re-melted with respective passes of the energy beams 134. With DMLS or SLS systems, typically the layers of powder material 118 are sintered, fusing particles of powder material 118 to one another generally without reaching the melting point of the powder material 118. The energy beam system 132 may include componentry integrated as part of the additive manufacturing machine 102 and/or componentry that is provided separately from the additive manufacturing machine 102.

The energy beam system 132 may include one or more irradiation devices 138 configured to generate a plurality of energy beams 134 and to direct the energy beams upon the build plane 128. An energy beam system 132 may include a plurality of irradiation devices, such as a first irradiation device 138a and a second irradiation device 138b. The one or more irradiation devices (e.g., the first irradiation device 138a and/or the second irradiation device 138b) may respectively include an energy beam source (e.g., energy beam sources 140a, 140b), an optical assembly (e.g., optical assemblies 142a, 142b), and a scanner (e.g., scanners 144a, 144b). The optical assembly (e.g., optical assemblies 142a, 142b) may include a plurality of optical elements configured to direct the energy beam onto the build plane 128. The optical assembly (e.g., optical assemblies 142a, 142b) may include one or more optical elements, such as lenses through which an energy beam may be transmitted along an optical path from the energy beam source to the build plane. By way of example, an optical assembly (e.g., optical assemblies 142a, 142b) may include one more focusing lenses that focus an energy beam 134 on a build plane 128. An exemplary scanner (e.g., scanners 144a, 144b) may include a galvo scanner, an electro-optic modulator, an acousto-optic modulator, a piezo-driven mirror, or the like. Additionally, or in the alternative, the energy beam system 132 may include a window 146, such as a protective glass, that separates one or more components of the energy beam system 132 from the environment of the process chamber 148 within which powder material 118 is irradiated by the one or more energy beams 134 to additively manufacture a three-dimensional object 114.

The window 146 may prevent contaminants from fumes associated with the additive manufacturing process, such as powder material, dust, soot, residues, vapor, splatter particles, byproducts, and the like, from coming into contact with sensitive components of an energy beam system 132. Accumulation of contaminants upon various optical elements of an optical assembly (e.g., optical assemblies 142a, 142b) may adversely affect operation of the energy beam system 132 and/or quality metrics associated with an energy beam system. Additionally, or in the alternative, such contaminants may cause damage to various optical elements of an optical assembly (e.g., optical assemblies 142a, 142b).

As shown in FIG. 1, the energy beam system 132 includes a first irradiation device 138a and a second irradiation device 138b. Additionally, or in the alternative, an energy beam system 132 may include three, four, six, eight, ten, or more irradiation devices, and such irradiation devices may respectively include an optical assembly (e.g., optical assemblies 142a, 142b). The plurality of irradiation devices 138 may be configured to respectively generate one or more energy beams that are respectively scannable within a scan field incident upon at least a portion of the build plane 128 to selectively consolidate the portions of the powder material 118 that are to become part of the object 114. For example, the first irradiation device 138a may generate a first energy beam 134a that is scannable within a first scan field 150a incident upon at least a first build plane region 152a. The second irradiation device 138b may generate a second energy beam 134b that is scannable within a second scan field 150b incident upon at least a second build plane region 152b. The first scan field 150a and the second scan field 150b may overlap such that the first build plane region 152a scannable by the first energy beam 134a overlaps with the second build plane region 152b scannable by the second energy beam 134b. The overlapping portion of the first build plane region 152a and the second build plane region 152b may sometimes be referred to as an interlace region 154. Portions of the powder bed 136 to be irradiated within the interlace region 154 may be irradiated by the first energy beam 134a and/or the second energy beam 134b in accordance with the present disclosure.

To irradiate a layer of the powder bed 136, the one or more irradiation devices 138 (e.g., the first irradiation device 138a and the second irradiation device 138b) respectively direct the plurality of energy beams 134 beams (e.g., the first energy beam 134a and the second energy beam 134b) across the respective portions of the build plane 128 (e.g., the first build plane region 152a and the second build plane region 152b) to selectively consolidate the portions of the powder material 118 that are to become part of the object 114. The one or more energy beams 134 may become incident upon the build plane 128 defined by the powder bed 136, for example, after passing through one or more optical elements of the optical assembly (e.g., optical assemblies 142a, 142b) and/or through a window 146 of the energy beam system 132. As sequential layers of the powder bed 136 are consolidated, a build piston 156 gradually lowers the build platform 130 to make room for sequential layers of powder material 118. As sequential layers of powder material 118 are applied across the build plane 128, the next sequential layer of powder material 118 defines the surface of the powder bed 136 coinciding with the build plane 128. Sequential layers of the powder bed 136 may be selectively consolidated until a completed object 114 has been additively manufactured. In some embodiments, an additive manufacturing machine may utilize an overflow module (not shown) to capture excess powder material 118. Additionally, or in the alternative, excess powder material 118 may be redistributed across the build plane 128 when applying a next sequential layer of powder material 118. It will be appreciated that other systems may be provided for handling the powder material 118, including different powder supply systems and/or excess powder recapture systems. The subject matter of the present disclosure may be practiced with any suitable additive manufacturing machine without departing from the scope hereof.

Still referring to FIG. 1, an additive manufacturing machine 102 may include an imaging system 158 (e.g., imaging systems 158a, 158b) configured to monitor one or more operating parameters of an additive manufacturing machine 102, one or more parameters of an energy beam system 132, and/or one or more operating parameters of an additive manufacturing process. The imaging system may a calibration system configured to calibrate one or more operating parameters of an additive manufacturing machine 102 and/or of an additive manufacturing process. The imaging system 158 may be a melt pool monitoring system. The one or more operating parameters of the additive manufacturing process may include operating parameters associated with additively manufacturing a three-dimensional object 114. The imaging system 158 may be configured to detect an imaging beam such as an infrared beam from a laser diode and/or a reflected portion of an energy beam (e.g., a first energy beam 134a and/or a second energy beam 134b).

An energy beam system 132 and/or an imaging system 158 may include one or more detection devices. The one or more detection devices may be configured to determine one or more parameters of an energy beam system 132, such as one or more parameters associated with irradiating the sequential layers of the powder bed 136 based at least in part on an assessment beam detected by the imaging system 158.

One or more parameters associated with consolidating the sequential layers of the powder bed 136 may include irradiation parameters and/or object parameters, such as melt pool monitoring parameters. The one or more parameters determined by the imaging system 158 may be utilized, for example, by the control system 104, to control one or more operations of the additive manufacturing machine 102 and/or of the additive manufacturing system 100. The one or more detection devices may be configured to obtain assessment data of the build plane 128 from a respective assessment beam. An exemplary detection device may include a camera, an image sensor, a photo diode assembly, or the like. For example, a detection device may include charge-coupled device (e.g., a CCD sensor), an active-pixel sensor (e.g., a CMOS sensor), a quanta image device (e.g., a QIS sensor), or the like. A detection device may additionally include a lens assembly configured to focus an assessment beam along a beam path to the detection device. An imaging system 158 may include one or more imaging optical elements (not shown), such as mirrors, beam splitters, lenses, and the like, configured to direct an assessment beam to a corresponding detection device.

In addition, or in the alternative, to determining parameters associated with irradiation the sequential layers of the powder bed 136, the imaging system 158 may be configured to perform one or more calibration operations associated with an additive manufacturing machine 102, such as a calibration operation associated with the energy beam system 132, one or more irradiation devices 138 or components thereof, and/or the imaging system 158 or components thereof. The imaging system 158 may be configured to project an assessment beam and to detect a portion of the assessment beam reflected from the build plane 128. The assessment beam may be projected by an irradiation device 138 and/or a separate beam source associated with the imaging system 158. Additionally, and/or in the alternative, the imaging system 158 may be configured to detect an assessment beam that includes radiation emitted from the build plane 128, such as radiation from an energy beam 134 reflected from the powder bed 136 and/or radiation emitted from a melt pool in the powder bed 136 generated by an energy beam 134 and/or radiation emitted from a portion of the powder bed 136 adjacent to the melt pool. The imaging system 158 may include componentry integrated as part of the additive manufacturing machine 102 and/or componentry that is provided separately from the additive manufacturing machine 102. For example, the imaging system 158 may include componentry integrated as part of the energy beam system 132. Additionally, or in the alternative, the imaging system 158 may include separate componentry, such as in the form of an assembly, that can be installed as part of the energy beam system 132 and/or as part of the additive manufacturing machine 102.

Still referring to FIG. 1, in some embodiments, an inertization system 160 may supply a flow of inert process gas 162 to one or more regions the process chamber 148, such as a region between the energy beam system 132 and the powder bed 136. The flow of inert process gas 162 may remove fumes from the process chamber 148 and/or to reduce the tendency of fumes to interfere with the energy beams 134 used to irradiate the powder material 118. Such fumes may present in the form of a plume emanating from a consolidation zone where an energy beam 134 becomes incident upon the powder bed 136 and may sometimes be referred to as a fume plume. A fume plume may include powder material, dust, soot, residues, vapors, splatter particles, byproducts, and the like. The flow if inert process gas 162 may also reduce the tendency of contaminants from fumes to deposit on the on the window 146, optical elements of the optical assembly (e.g., optical assemblies 142a, 142b), or other components of the energy beam system 132. The inertization system 160 may provide a directional flow of inert process gas 162 that flows across the build plane 128. For example, as shown, the process gas 162 flows from left to right. The inertization system 160 may include a supply manifold 164 and a return manifold 166. The process gas 162 may flow from the supply manifold 164 to the return manifold 166. Fumes in the process chamber 148 may be drawn into the return manifold 166. In some embodiments, the supply manifold 164 and/or the return manifold 166 may be coupled to, or define a portion of, a perimeter wall of the process chamber 148. Additionally, or in the alternative, the supply manifold 164 and/or the return manifold 166 may be coupled to a housing assembly 168 that contains one or more components of the energy beam system 132, such as one or more irradiation devices 138 and or one or more imaging systems 158. With the supply manifold 164 and/or the return manifold 166 coupled to the housing assembly 168, a relatively small volume of space between the energy beam system 132 and the powder bed 136 may be inertized, as opposed to inertizing an entire process chamber 148. Additionally, or in the alternative, a fume plume may have a shorter path to travel before being drawn into the return manifold 166 by the flow of inert process gas 162.

The energy beam system 132 may be positioned at any suitable location within the process chamber 148. Additionally, or in the alternative, the energy beam system 132 may be coupled to a perimeter wall of the process chamber 148. In some embodiments, an additive manufacturing machine may include a positioning system 170 configured to move an energy beam system 132 and/or one or more components thereof relative to the build plane 128. The positioning system 170 may be configured to move the energy beam system 132 and/or one or more components thereof to specified build coordinates and/or along specified build vectors corresponding to a cartesian coordinate system in accordance with control commands provided, for example, by the control system 104. The control commands may be provided, for example, to carry out operations of the one or more energy beam system 132 and/or of the additive manufacturing machine 102 in accordance with the present disclosure. The positioning system 170 may include one or more gantry elements 172 configured to move the energy beam system 132 and/or one or more components thereof across the powder bed. Respective gantry elements 172 may be configured to move the energy beam system 132 and/or one or more components thereof in one or more directions, such as an X-direction, a Y-direction, and/or a Z-direction. In some embodiments, the positioning system 170 may be coupled to the housing assembly 168 that contains one or more components of the energy beam system 132. The housing assembly 168 may be coupled to one or more gantry elements 172 by one or more gantry mounts 174. The positioning system 170 may include a drive motor 176 configured to move the housing assembly 168 and/or the one or more components the energy beam system 132 according to instructions for the control system 104. The positioning system 170 may include componentry typically associated with a gantry system, such as stepper motors, drive elements, carriages, and so forth.

Figure 2:
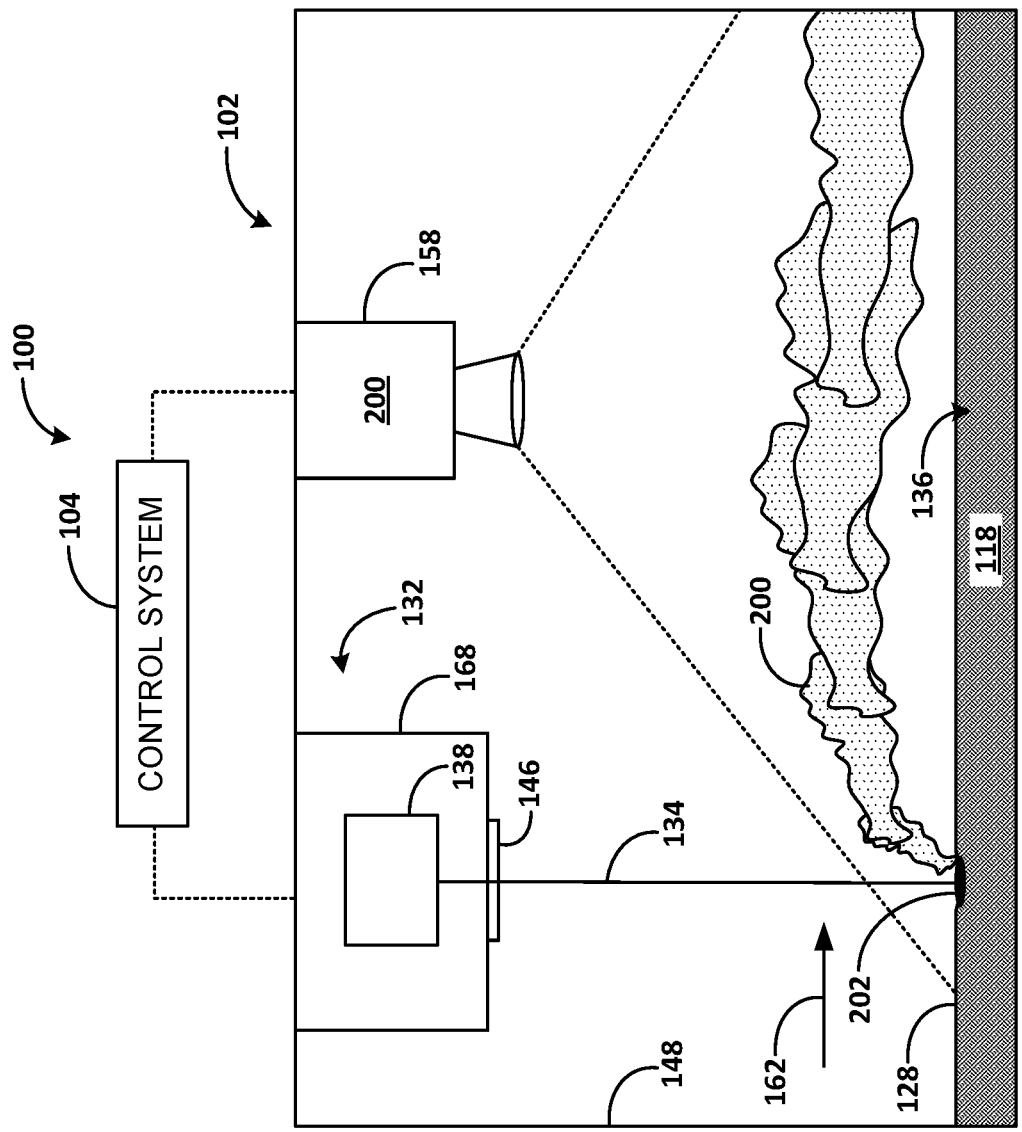
FIG. 2 schematically depicts a side perspective view of a fume plume within a process chamber of an additive manufacturing machine.

Now referring to FIG. 2, an exemplary fume plume 200 within a process chamber 148 of an additive manufacturing machine 102 is shown. The fume plume 200 may emanate from a beam spot 202 formed by an energy beam 134 irradiating the powder bed 136. The beam spot 202 may include a consolidation zone, such as a melt pool, a sintering region, or the like. A flow of inert process gas 162 may cause the fume plume 200 to propagate generally downstream from the beam spot 202. As indicated in FIG. 2, the process gas 162 may flow from left to right, such that an upstream region of the process chamber 148 is on the left and a downstream region of the process chamber 148 is on the right. Generally, the fume plume 200 may spread laterally as the fume plume 200 propagates downstream across the process chamber 148. As the fume plume 200 propagates across the process chamber 148, the fume plume 200 may occlude a corresponding region of the build plane 128. The region of the build plane 128 occluded by the fume plume 200 represents the region of the build plane 128 with respect to which an energy beam 134 incident thereon transects the fume plume 200. Generally, a region of the build plane 128 occluded by a fume plume 200 includes the region of the build plane 128 directly below the fume plume 200. In some embodiments, the region of the build plane 128 occluded by a fume plume 200 may depend at least in part on an angle of incidence of the energy beam 134. Upon having irradiated a beam spot 202, a region of the build plane may become nonoccluded by the fume plume 200 from upstream to downstream as the fume plume 200 propagates across the process chamber 148. The fume plume 200 may exit the process chamber 148 through a return manifold 166 of an inertization system 160 (FIG. 1), thereby rendering an increasing portion of the build plane 128 nonoccluded as the fume plume 200 exits the process chamber 148.

As shown in FIG. 2, the additive manufacturing machine 102 may include an imaging system 158 configured to capture image data from which a location of a fume plume 200 may be determined. The location of the fume plume 200 may be utilized to determine a region of the build plane 128 occluded by the fume plume 200. The imaging system 158 may include one or more detection devices 204 configured to capture suitable image data for determining the location of the fume plume 200. The detection device 204 may be configured to capture image data corresponding to any suitable wavelength or wavelength range, including, for example, a wavelength or wavelength range that includes at least a portion of the visible spectrum, the ultraviolet spectrum, or the infrared spectrum, as well as a combination thereof. The imaging system 158 may be integrated with the energy beam system 132 of the additive manufacturing machine 102, such as within a housing assembly 168 of an energy beam system 132. Additionally, or in the alternative, the imaging system 158 may be provided as separate componentry that may be permanently or temporarily installed, such as within a process chamber 148 of an additive manufacturing machine 102 and/or with a view through a window 146 with a suitable field of view within the process chamber 148. In some embodiments, the imaging system 158 and/or the one or more detection devices 204 configured to capture image data for determining the location of a fume plume 200 may be the same imaging system 158 and/or the same detection devices 204 utilized to determine one or more parameters of an energy beam system 132, such as that used for melt pool monitoring. Additionally, or in the alternative, separate imaging systems 158 and/or detection devices 204 may be provided for these purposes. An exemplary detection device 204 may include a camera, an image sensor, a photo diode assembly, or the like. For example, a detection device 204 may include charge-coupled device (e.g., a CCD sensor), an active-pixel sensor (e.g., a CMOS sensor), a quanta image device (e.g., a QIS sensor), or the like.

As illustrated in FIG. 2, a fume plume 200 may be generally located downstream from a beam spot 202. However, in some embodiments, a fume plume 200 may be located upstream from a beam spot 202. For example, a location of a fume plume 200 may depend on a scan direction of an energy beam 134. Additionally, or in the alternative, a fume plume 200 may occupy a region of the process chamber 148 that changes over time. For example, the location and/or one or more dimensions of the fume plume 200 may change over time. Additionally, or in the alternative, a fume plume 200 may occupy a region of the process chamber 148 that depends at least in part on one or more process parameters associated with the additive manufacturing machine 102. For example, one or more process parameters may influence the region of the process chamber 148 occupied by the fume plume 200 at a specified time and/or during a specified time interval. The image data may be utilized to determine a region of the build plane 128 that may be occluded by a fume plume 200 at various times during an irradiation sequence and/or under various process conditions. Exemplary process conditions may include irradiation parameters, powder material parameters, gas flow parameters, or scan vector parameters.

Referring now to FIGS. 3A-3D, fume plume data 300 may be generated based at least in part on one or more empirical assessments of a location of one or more fume plumes 200 within a process chamber 148. As shown in FIGS. 3A-3D, the fume plume data 300 may include image data 302 that includes a representation of one or more empirical fume plumes 304 within the process chamber 148. The fume plume data 300 may also include data generated from the image data 302. The image data 302 may be captured by a detection device 204. The one or more empirical fume plumes 304 may respectively include a fume plume 200 generated during one or more empirical assessments performed at respectively different times and/or under respectively different process conditions associated with an additive manufacturing machine 102. In some embodiments, the one or more empirical assessments may be performed during a model training period performed to generate fume plume data 300 that may be utilized to determine a correlation between one or more process conditions associated with an additive manufacturing machine and a location of one or more fume plumes 200. The one or more empirical assessments may be performed and/or updated from time to time. Additionally, or in the alternative, the one or more empirical assessments may utilize fume plume data 300 generated in real-time during an additive manufacturing process, such as during a then-current additive manufacturing process and/or a previous additive manufacturing process. For example, a model training period may be performed in real-time during an additive manufacturing process. Additionally, or in the alternative, the empirical assessments may be performed by a machine learning technology configured to analyze the fume plume data 300. The one or more empirical assessments may include fume plume data 300 specific to an additive manufacturing machine 102 and/or fume plume data 300 corresponding to one or more other additive manufacturing machines 102, such as fume plume data 300 corresponding to a fleet of additive manufacturing machines 102.

A location of one or more empirical fume plumes 304 within a process chamber 148 may be determined based at least in part on the fume plume data 300, for example, using a contour tracing algorithm or the like, such as a pixel following algorithm, a vertex following algorithm, a run-data-based following algorithm, and so forth. A region of a build plane 128 occluded by the one or more empirical fume plumes 304 may be determined, for example, by translating the location of the one or more empirical fume plumes 304 within the process chamber 148 to a location of the build plane 128, for example, with reference to a coordinate system utilized by an additive manufacturing machine 102, such as a coordinate system corresponding to the build plane 128. The region of a build plane 128 occluded by the one or more empirical fume plumes 304 may be correlated to one or more process conditions associated with an additive manufacturing machine 102, such as the one or more process conditions corresponding to the fume plume data 300.

The fume plume data 300 may additionally or alternatively include data representing a correlation between a region of the build plane 128 occluded by one or more empirical fume plumes 304 and one or more process conditions associated with an additive manufacturing machine 102. Three-dimensional objects 114 may be additively manufactured using an irradiation control module to selectively consolidate sequential layers of powder material 118. The irradiation control module may include one or more consolidation models generated based at least in part on the fume plume data 300. The one or more consolidation models may be generated and/or updated, modified, adjusted, or the like from time to time, including, for example, including, for example, periodically, in connection with a calibration sequence, a change to an additive manufacturing machine 102 or operation thereof, and/or in real-time. For example, fume plume data 300 generated when additively manufacturing a first portion of an object 114 may be incorporated into a consolidation model utilized by an irradiation control module to additively manufacture a second portion of the object 114. Additionally, or in the alternative, fume plume data 300 generated when additively manufacturing a first object 114 may be incorporated into a consolidation model utilized by an irradiation control module to additively manufacture a second object 114.

As shown in FIG. 3A, a region of the build plane 128 occluded by a fume plume 200 may depend at least in part on a duration of exposure to irradiation from an energy beam 134. At a first time (t_1), a relatively small fume plume 200 may emanate from a beam spot 202. The fume plume 200 may grow as with increasing exposure duration, such as from the first time (t_1) to a second time (t_2) and/or to a third time (t_3). For example, the fume plume 200 may propagate downstream and/or the fume plume 200 may spread laterally with increasing exposure duration. The fume plume 200 may continue to propagate downstream and/or spread laterally following an interruption of irradiation, for example, at an n-th time (t_n) following the exposure duration. As illustrated in FIG. 3A, image data 302 captured by a detection device 204 may include a digital representation of a region of a process chamber 148 occupied by one or more empirical fume plumes 304 as a function of a duration of irradiation from an energy beam 134. A region of the build plane 128 occluded by the one or more empirical fume plumes 304 may be determined based at least in part on image data 302 representing a region of a process chamber 148 occupied by the one or more empirical fume plumes 304 as a function of a duration of irradiation from an energy beam 134.

As shown in FIG. 3B, a region of the build plane 128 occluded by a fume plume 200 may depend at least in part on one or more consolidation parameters, such as one or more parameters associated an energy beam 134 used to irradiate the powder bed 136 and/or one or more parameters associated with the powder material 118 used to form the powder bed 136. Exemplary irradiation parameters that may influence the location and/or one or more dimensions of a region of the build plane 128 occluded by a fume plume 200 include beam power, spot size, intensity, beam profile, or power density, scanning speed, as well as combinations of these. Exemplary parameters associated with the powder material 118 that may influence the region of the build plane 128 occluded by a fume plume 200 include material composition, and/or powder particle size. By way of illustration, a first consolidation parameter value (p_1) may produce a relatively small fume plume 200 emanating from a beam spot 202. Different consolidation parameter values (p_2, p_3, ... p_n) may yield a respectively different region of the build plane 128 occluded by a fume plume 200. As shown in FIG. 3B, a size of a beam spot 202 may be correlated to a region of the build plane 128 occluded by one or more empirical fume plumes 304. As illustrated in FIG. 3B, image data 302 captured by a detection device 204 may include a digital representation of one or more empirical fume plumes 304 corresponding to one or more various consolidation parameters. By way of example, the one or more consolidation parameters illustrated in the image data 302 shown in FIG. 3B may include irradiation parameters and/or parameters associated with the powder material 118. A region of the build plane 128 occluded by the one or more empirical fume plumes 304 may be determined based at least in part on image data 302 representing a region of a process chamber 148 occupied by the one or more empirical fume plumes 304 as a function of such one or more consolidation parameters.

Figures 3C, 3D:
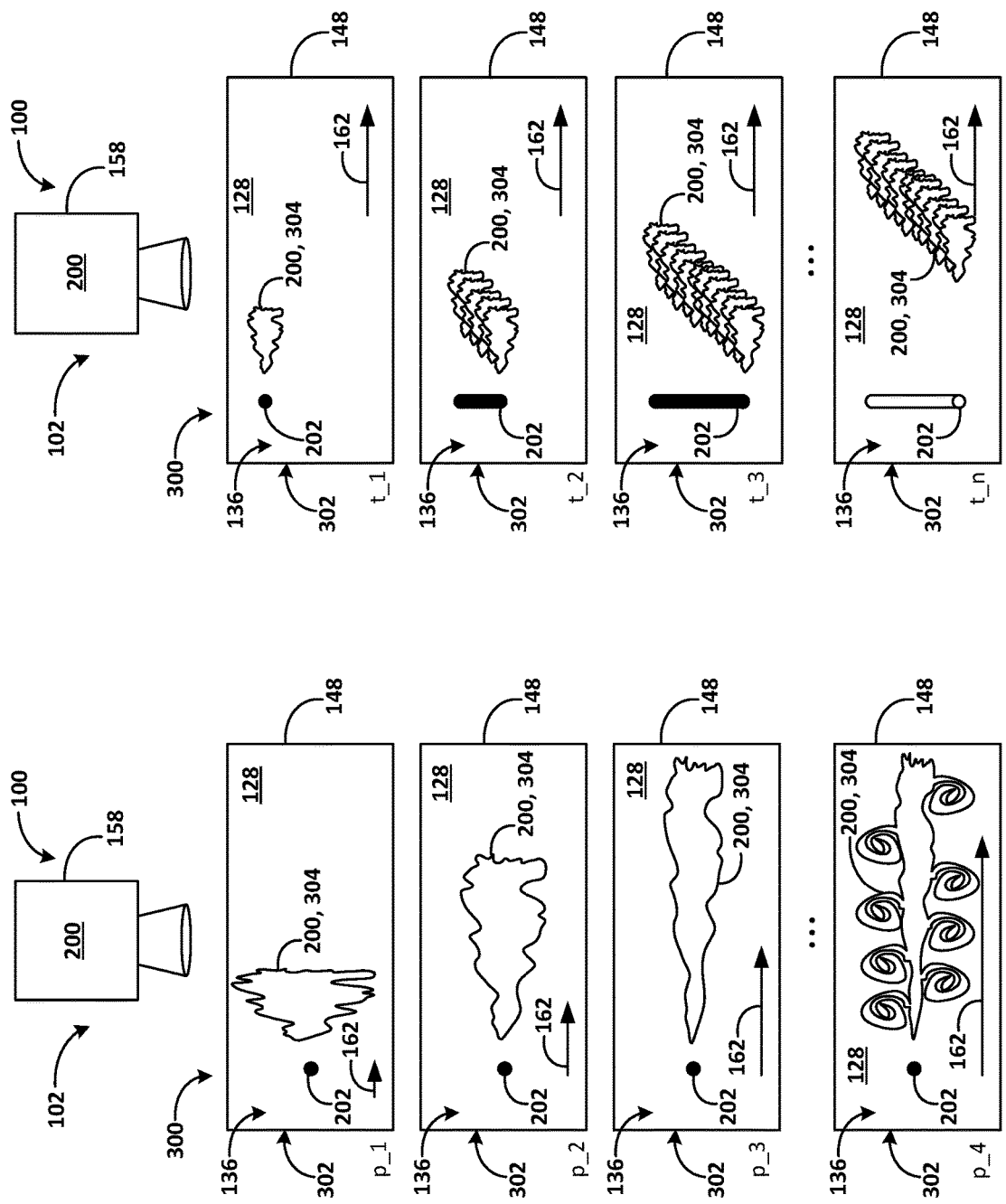

As shown in FIG. 3C, a region of the build plane 128 occluded by a fume plume 200 may depend at least in part on one or more gas flow parameters corresponding to a flow of inert process gas 162 used to remove fumes from the process chamber 148. Exemplary gas flow parameters that may influence the region of the build plane 128 occluded by a fume plume 200 include volumetric flow rate, velocity, flow character (e.g., laminar, turbulent, degree of mixing, etc.), gas composition, gas density, or pressure, as well as combinations of these. Additionally, or in the alternative, the region of the build plane 128 occluded by a fume plume 200 may depend at least in part on a configuration of one or more flow conditioners, such as baffles, dampers, flow straighteners, and the like. By way of illustration, a first gas flow parameter value (p_1) may produce a relatively wide fume plume 200 emanating from a beam spot 202. Different gas flow parameter values (p_2, p_3, . . . p_n) may yield a respectively different region of the build plane 128 occluded by a fume plume 200. As shown in FIG. 3C, a region of the build plane 128 occluded by one or more empirical fume plumes 304 may be proportional to a volumetric flow rate, velocity, flow characteristic, or pressure of the inert gas flowing through the process chamber 148. In some embodiments, a lateral spread of a fume plume 200 may be proportional to volumetric flow rate, velocity, flow characteristic, or pressure of the inert gas flowing through the process chamber 148. Additionally, or in the alternative, increasing turbulence may cause increased lateral spread of the fume plume 200. As illustrated in FIG. 3C, image data 302 captured by a detection device 204 may include a digital representation of one or more empirical fume plumes 304 corresponding to one or more various process gas parameters. A region of the build plane 128 occluded by one or more empirical fume plumes 304 may be determined based at least in part on image data 302 representing a region of a process chamber 148 occupied by the one or more empirical fume plumes 304 as a function of such one or more gas flow parameters.

As shown in FIG. 3D, a region of the build plane 128 occluded by a fume plume 200 may depend at least in part on one or more scan vector parameters corresponding to a path of a beam spot 202 propagating across the powder bed 136. Exemplary scan vector parameters that may influence the location and/or one or more dimensions of a region of the build plane 128 occluded by a fume plume 200 include scan vector direction, scan vector velocity, scan vector length, or scan vector spacing, as well as combinations of these. By way of illustration, as shown in FIG. 3D, a scan vector propagating orthogonal to the direction of process gas flow may provide a fume plume 200 that extends laterally across the process chamber 148. As shown in FIG. 3D, image data 302 captured by a detection device 204 may include a digital representation of one or more empirical fume plumes 304 corresponding to one or more various scan vector parameters. A region of the build plane 128 occluded by one or more empirical fume plumes 304 may be determined based at least in part on image data 302 representing a region of a process chamber 148 occupied by the one or more empirical fume plumes 304 as a function of such one or more scan vector parameters.

Figure 4A:
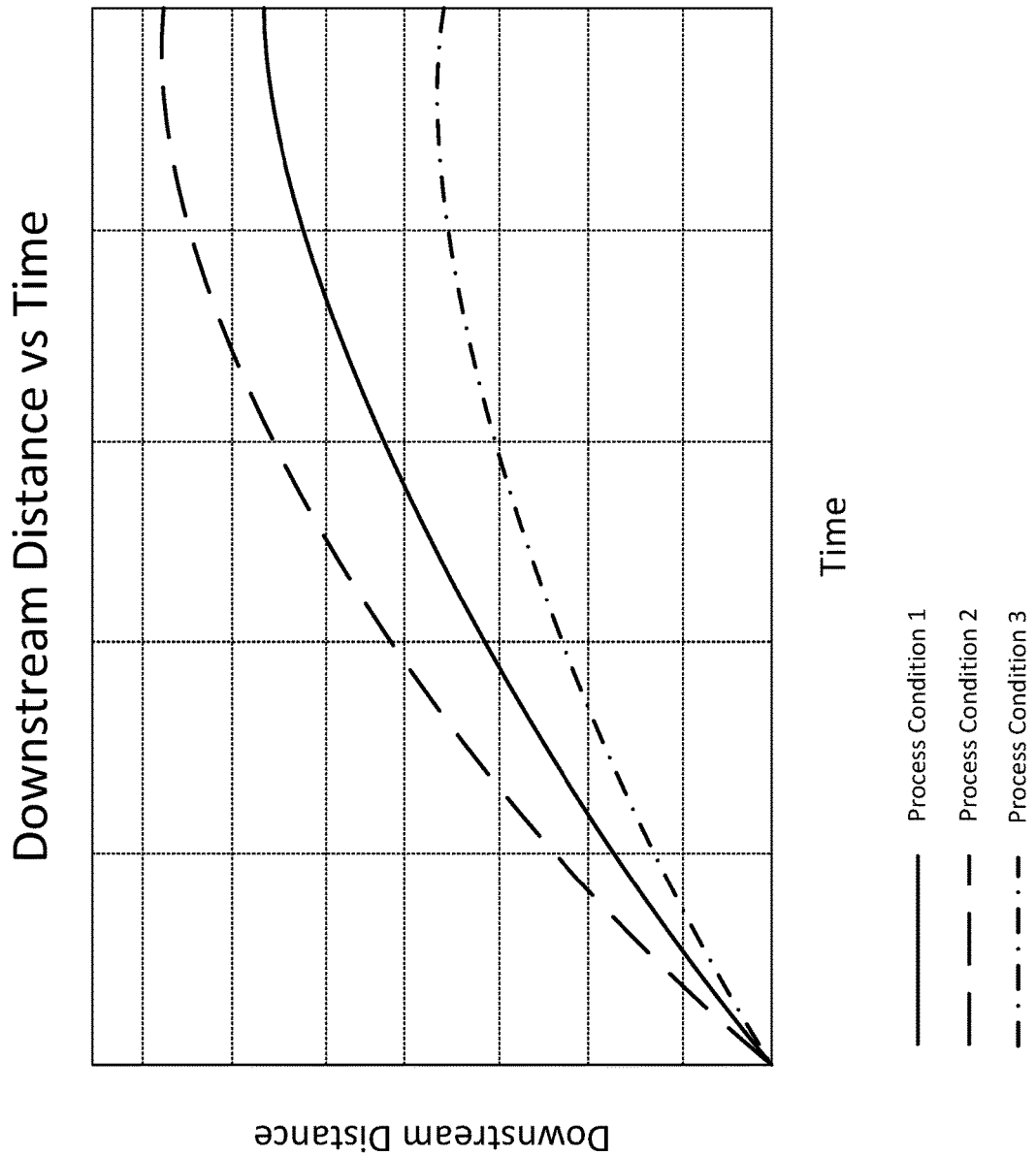
Figure 4B:
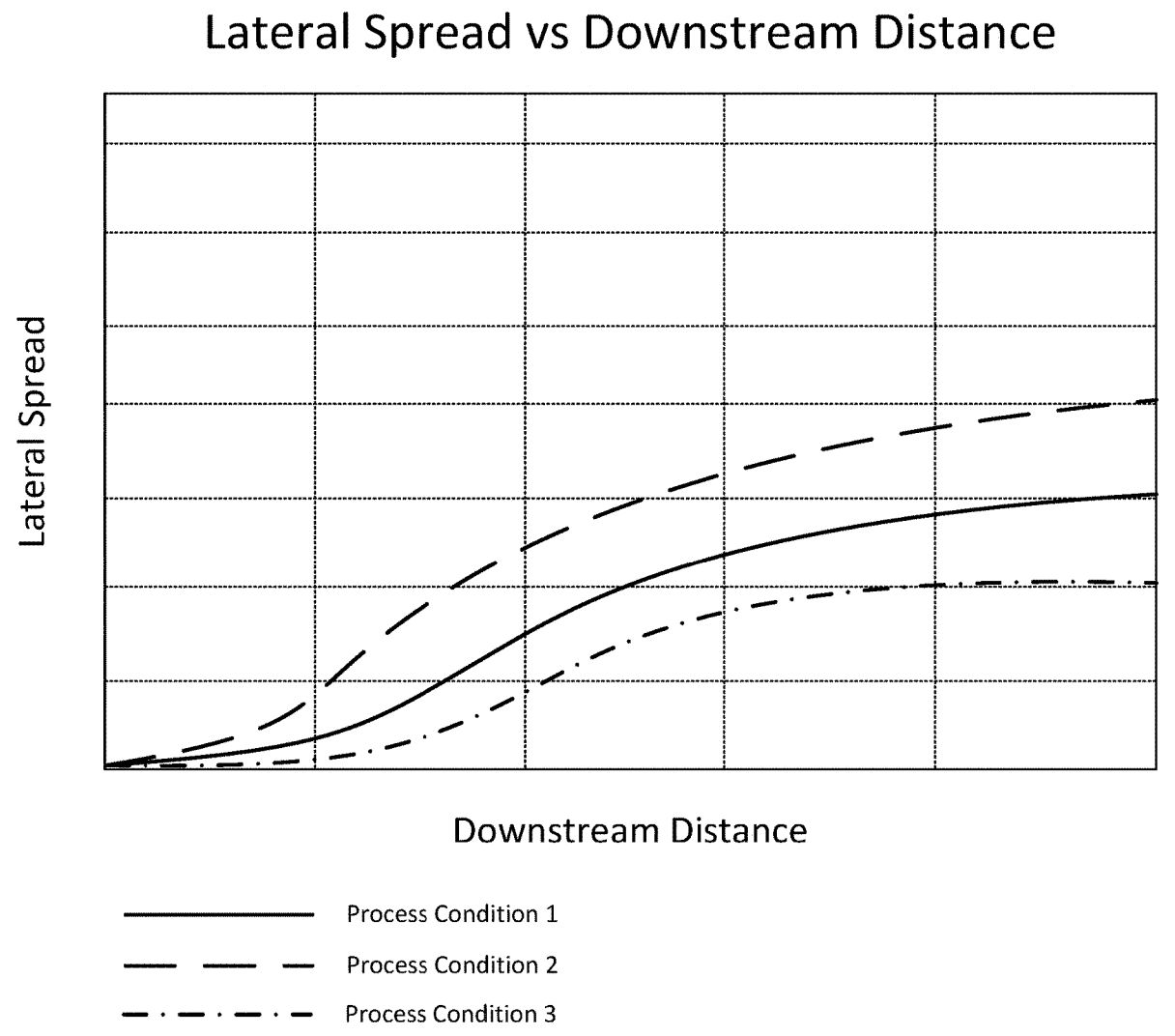
Figure 4C:
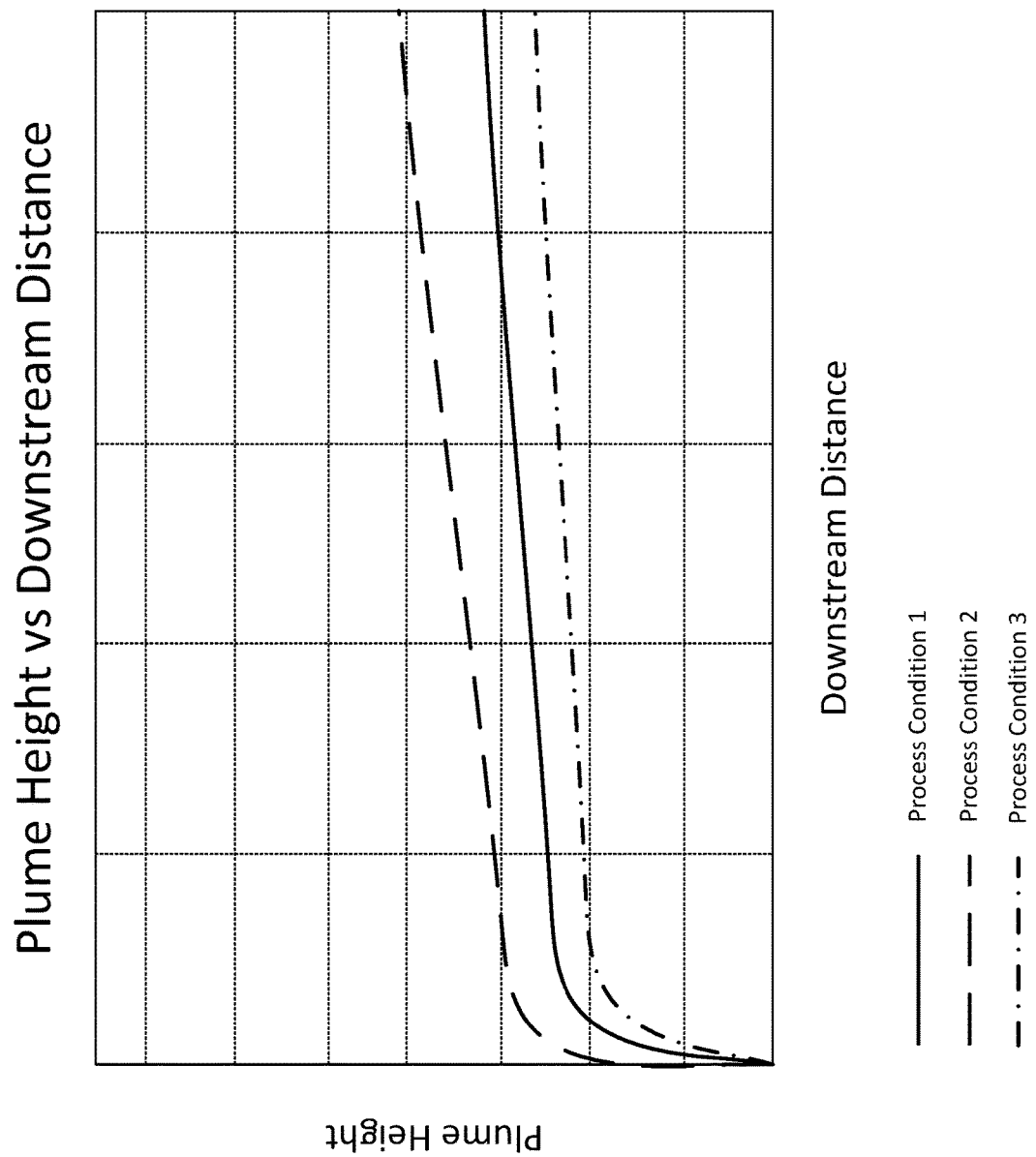
Figure 4D:
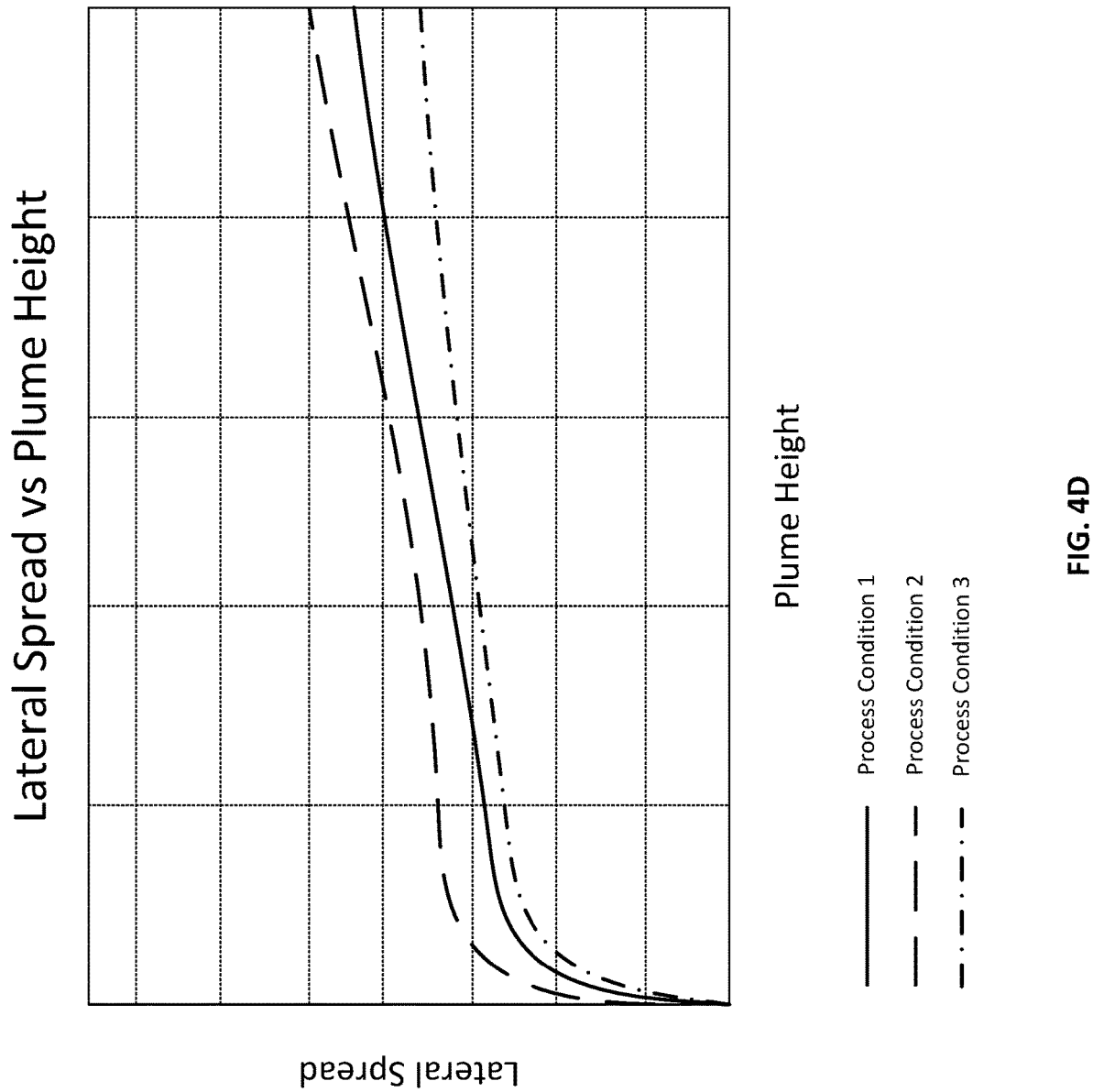

Referring now to FIGS. 4A-4D, a fume plume model may include a correlation between a region of a build plane 128 occluded by a fume plume 200 and one or more process conditions associated with an additive manufacturing machine 102. The region of the build plane 128 occluded by a fume plume 200 may include a two-dimensional region or a three-dimensional region. The fume plume model may be based at least in part on fume plume data 300 generated during one or more empirical assessments. A fume plume model, and/or one or more correlations included in a fume plume model, may be generated and/or updated, modified, adjusted, or the like from time to time, including, for example, periodically, in connection with a calibration sequence, a change to an additive manufacturing machine 102 or operation thereof, and/or in real-time. By way of example, as shown in FIG. 4A, a fume plume model may include a correlation between downstream distance of a fume plume 200 and time. The time element of such correlation may include a duration of irradiation of a beam spot 202 and/or time elapsed since generating a beam spot 202. The correlation may depend at least in part on one or more process conditions, such as process conditions corresponding to one or more consolidation parameters (e.g., irradiation parameters and/or powder material parameters), gas flow parameters, or scan vector parameters, as well as combinations of these. Additionally, or in the alternative, as shown in FIG. 4B, a fume plume model may include a correlation between lateral spread of a fume plume 200 and downstream distance of the fume plume 200. The correlation may depend at least in part on one or more process conditions, such as process conditions corresponding to one or more consolidation parameters (e.g., irradiation parameters and/or powder material parameters), gas flow parameters, or scan vector parameters, as well as combinations of these. Additionally, or in the alternative, as shown in FIG. 4C, a fume plume model may include a correlation between a height of a fume plume 200 and downstream distance of the fume plume 200. The correlation may depend at least in part on one or more process conditions, such as process conditions corresponding to one or more consolidation parameters (e.g., irradiation parameters and/or powder material parameters), gas flow parameters, or scan vector parameters, as well as combinations of these. Additionally, or in the alternative, as shown in FIG. 4D, a fume plume model may include a correlation between lateral spread of a fume plume 200 and the height of a fume plume 200. The correlation may depend at least in part on one or more process conditions, such as process conditions corresponding to one or more consolidation parameters (e.g., irradiation parameters and/or powder material parameters), gas flow parameters, or scan vector parameters, as well as combinations of these. It will be appreciated that the correlations described with reference to FIGS. 4A-4D are provided by way of example and not to be limiting. Other correlations are also contemplated, and any one or more correlations between a region of a build plane 128 occluded by a fume plume 200 and one or more process conditions associated with an additive manufacturing machine 102 may be included in a fume plume model.

Figure 5B:
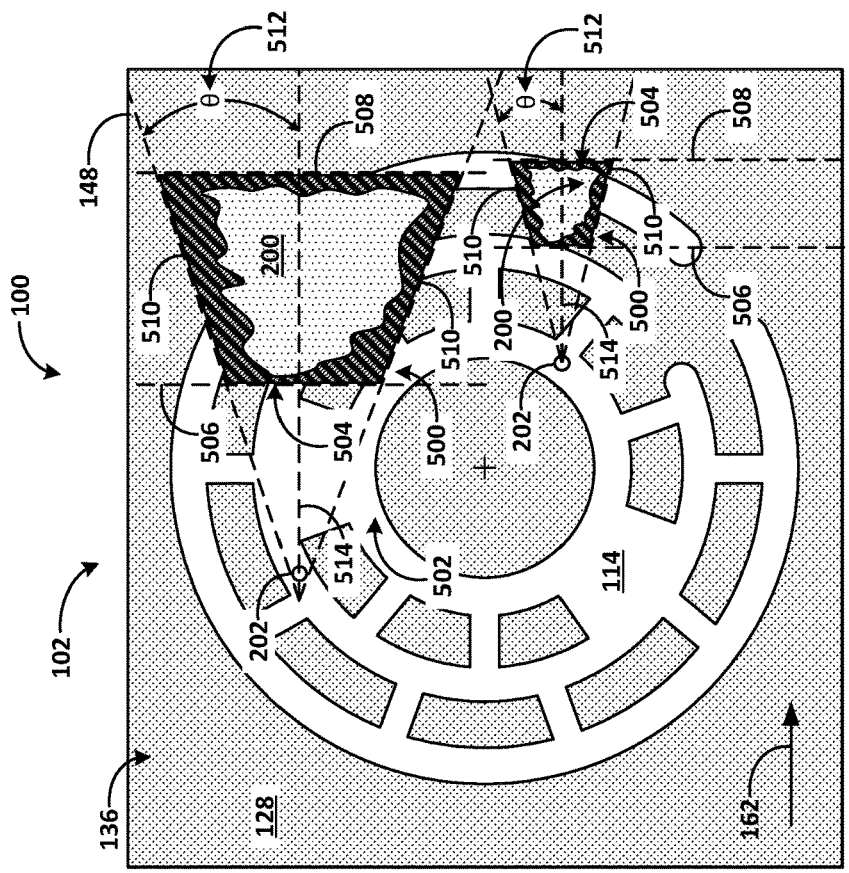
FIGS. 5A and 5B respectively show exemplary occlusion zones indicating a region of a build plane predicted to be at least partially occluded by a fume plume.
Figure 5A:
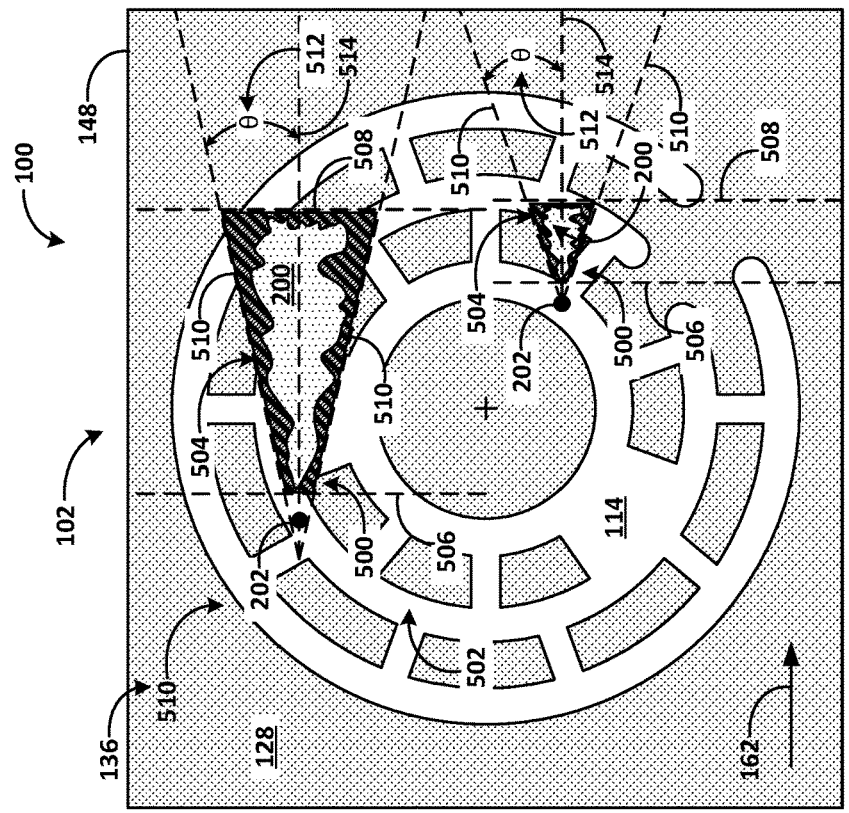

Referring now to FIGS. 5A and 5B, an occlusion zone model may be configured to determine a predicted location of one or more fume plumes 200 emitted from a powder material 118 when irradiated by one or more energy beams 134. The predicted location of the one or more fume plumes 200 may include a region of a build plane 128 predicted to be occluded by the one or more fume plumes 200. The predicted location of a fume plume 200 may be determined based at least in part on a fume plume model. The predicted location of a fume plume 200 may be described with reference to an occlusion zone 500. As used herein, the term "occlusion zone" 500 refers to a region of a build plane 128 predicted to be at least partially occluded by a fume plume 200. The region of a build plane 128 predicted to be at least partially occluded by a fume plume 200 may be described with reference to a location of one or more boundaries thereof. The one or more boundaries of an occlusion zone 500 may be described with reference to coordinates associated with a coordinate system corresponding an additive manufacturing machine 102, such as a coordinate system corresponding to the build plane 128. An occlusion zone 500 may depend at least in part on a time and/or a time interval corresponding to an irradiation sequence.

In addition, or in the alternative to an occlusion zone 500, an occlusion zone model may be configured to determine a location of an inert zone 502 based at least in part on a predicted location of one or more fume plumes 200, such as based at least in part on a location of one or more occlusion zones 500. As used herein, the term "inert zone" 502 refers to a region of a build plane 128 predicted to be free from occlusion by a fume plume 200. The region of a build plane 128 predicted to be at free from occlusion by a fume plume 200 may be described with reference to a location of one or more boundaries thereof, such as one or more boundaries of an occlusion zone 500. An inert zone 502 may correspond to a region of the process chamber 148 occupied by inert process gas 162. The one or more boundaries of an inert zone 502 may be described with reference to coordinates associated with a coordinate system corresponding an additive manufacturing machine 102, such as a coordinate system corresponding to the build plane 128. An inert zone 502 may depend at least in part on a time and/or a time interval corresponding to an irradiation sequence. In some embodiments, an inert zone 502 may be determined based at least in part on a difference between a build plane 128 and a location of one or more occlusion zones 500. For example, an inert zone 502 may include a region of a build plane 128 that is not occupied by an occlusion zone 500. An occlusion zone model, and/or one or more occlusion zones 500 and/or inert zones 502 determined by an occlusion zone model, may be generated and/or updated, modified, adjusted, or the like from time to time, including, for example, periodically, in connection with a calibration sequence, a change to an additive manufacturing machine 102 or operation thereof, and/or in real-time.

An occlusion zone 500 may include, and/or may be defined at least in part by one or more occlusion boundaries 504. The one or more occlusion boundaries 504 may delineate an occlusion zone 500 from an inert zone 502. The one or more occlusion boundaries 504 may define a perimeter of the occlusion zone 500. The location of the one or more occlusion boundaries 504 may be determined based at least in part on a correlation between one or more process conditions and a region of the build plane 128 occluded by the fume plume 200, such as based at least in part on a fume plume model. The one or more occlusion boundaries 504 may depend at least in part on a time and/or a time interval corresponding to an irradiation sequence, for example, based at least in part on the fume plume model.

An occlusion zone 500 and/or an occlusion boundary 504 may include an upstream occlusion boundary 506. Additionally, or in the alternative, an inert zone 502 may include an upstream occlusion boundary 506. The location of an upstream occlusion boundary 506 may correspond to an upstream boundary of an occlusion zone 500 and/or a downstream boundary of an inert zone 502. The location of an upstream occlusion boundary 506 may depend at least in part on a time and/or a time interval corresponding to an irradiation sequence. A fume plume 200 may be predicted to be located downstream of an upstream occlusion boundary 506, for example, based at least in part on a fume plume model. A region of the build plane 128 located downstream from the upstream occlusion boundary 506 may be predicted to be at least partially occluded by the fume plume 200. Additionally, or in the alternative, a region of the build plane 128 located upstream from the upstream occlusion boundary 506 may be predicted to be free from occlusion by the fume plume 200.

An occlusion zone 500 and/or an occlusion boundary 504 may include a downstream occlusion boundary 508. Additionally, or in the alternative, an inert zone 502 may include a downstream occlusion boundary 508. The location of a downstream occlusion boundary 508 may correspond to a downstream boundary of an occlusion zone 500 and/or an upstream boundary of an inert zone 502. The location of a downstream occlusion boundary 508 may depend at least in part on a time and/or a time interval corresponding to an irradiation sequence. A fume plume 200 may be predicted to be located upstream of a downstream occlusion boundary 508, for example, based at least in part on a fume plume model. A region of the build plane 128 located upstream from the downstream occlusion boundary 508 may be predicted to be at least partially occluded by the fume plume 200. Additionally, or in the alternative, a region of the build plane 128 located downstream from the downstream occlusion boundary 508 may be predicted to be free from occlusion by the fume plume 200.

An occlusion zone 500 and/or an occlusion boundary 504 may include one or more lateral occlusion boundaries 510. Additionally, or in the alternative, an inert zone 502 may include one or more lateral occlusion boundaries 510. The location of a lateral occlusion boundary 510 may correspond to a lateral boundary of an occlusion zone 500 and/or a lateral boundary of an inert zone 502. The location of a lateral occlusion boundary 510 may depend at least in part on a time and/or a time interval corresponding to an irradiation sequence. A fume plume 200 may be predicted to be located laterally relative to a lateral occlusion boundary 510, for example, based at least in part on a fume plume model. A region of the build plane 128 located laterally congruent with a fume plume 200 relative to the lateral occlusion boundary 510 may be predicted to be at least partially occluded by the fume plume 200. Additionally, or in the alternative, a region of the build plane 128 located laterally obverse relative to the lateral occlusion boundary 510 may be predicted to be free from occlusion by the fume plume 200.

In some embodiments, as shown in FIGS. 5A and 5B, a lateral occlusion boundary 510 may have a lateral pitch 512 corresponding to a lateral spread of the fume plume 200. The lateral pitch of a lateral occlusion boundary 510 may depend at least in part on a time and/or a time interval corresponding to an irradiation sequence. The slope may be determined relative to a lateral axis 514 of the build plane 128 oriented parallel to a direction of flow of inert process gas 162. The lateral spread of the fume plume 200 may be determined, for example, based at least in part on a fume plume model. In some embodiments, an occlusion zone 500 may be delineated by a first lateral occlusion boundary 510 and a second lateral occlusion boundary 510. The first lateral occlusion boundary 510 and the second lateral occlusion boundary 510 may intersect, for example, at a location of the build plane 128 at or near a beam spot 202, such as upstream from a beam spot 202. Additionally, or in the alternative, first lateral occlusion boundary 510 and the second lateral occlusion boundary 510 may diverge in a downstream direction corresponding to the respective lateral pitch 512 of the first lateral occlusion boundary 510 and the second lateral occlusion boundary 510.

In some embodiments, an upstream occlusion boundary 506 may transect one or more lateral occlusion boundaries 510. Additionally, or in the alternative, a downstream occlusion boundary 508 may transect one or more lateral occlusion boundaries 510. An occlusion zone 500 and/or an inert zone 502 may be defined at least in part by at least one of: an upstream occlusion boundary 506, a downstream occlusion boundary 508, and one or more lateral occlusion boundaries 510. In some embodiments, an occlusion zone 500 and/or an inert zone 502 may be defined without reference to an upstream occlusion boundary 506 and/or without reference to a downstream occlusion boundary 508. For example, an occlusion zone 500 and/or an inert zone 502 may be defined by one or more lateral occlusion boundaries 510. In some embodiments, an occlusion zone 500 and/or an inert zone 502 may be defined without reference to a lateral occlusion boundary 510. For example, an occlusion zone 500 and/or an inert zone 502 may be defined by an upstream occlusion boundary 506 and/or a downstream occlusion boundary 508.

By way of example, as shown in FIGS. 5A and 5B, a build plane 128 may include a plurality of occlusion zones 500. Respective ones of the plurality of occlusion zones 500 may corresponding to a respective one of a plurality of beam spots 202. A location and/or one or more dimensions of the respective occlusion zones 500 may depend at least in part on a time and/or time interval, and/or one or more process conditions associated with the corresponding fume plume 200. For example, as shown in FIG. 5A, a difference between a first occlusion zone 500 and a second occlusion zone 500 may be attributable at least in part to a difference in time from the corresponding beam spot 202 having been irradiated. A relatively longer irradiation duration may generate a relatively larger fume plume 200, and a fume plume model may provide a correspondingly larger occlusion zone 500. For example, a distance between a beam spot 202 and a downstream occlusion boundary 508, and/or a distance between a downstream occlusion boundary 508 and an upstream occlusion boundary 506, may depend at least in part on an irradiation duration of a corresponding beam spot 202. Additionally, or in the alternative, a lateral pitch 512 of a lateral occlusion boundary 510 may depend at least in part on an irradiation duration of a corresponding beam spot 202.

Additionally, or in the alternative, as shown in FIG. 5B, a first occlusion zone 500 and a second occlusion zone 500 may differ in respect of one or more dimensions attributable at least in part to downstream propagation of the fume plume 200 after the corresponding beam spot 202 has been irradiated. A fume plume 200 may propagate relatively further downstream with a relatively longer duration since the corresponding beam spot 202 was irradiated, and a fume plume model may provide an occlusion zone 500 located correspondingly further downstream. For example, a distance between a beam spot 202 and an upstream occlusion boundary 506 and/or a downstream occlusion boundary 508 may depend at least in part on a duration from a time when a corresponding beam spot 202 was irradiated.

Additionally, or in the alternative, a lateral pitch 512 of a lateral occlusion boundary 510 may depend at least in part on n duration from a time when a corresponding beam spot 202 was irradiated. For example, a fume plume 200 may spread laterally as the fume plume 200 propagates downstream, and the fume plume model may provide a correspondingly wider occlusion zone 500. Additionally, or in the alternative, the difference in dimensions and/or spatial position of the respective occlusion zones 500 and/or corresponding occlusion boundaries 504 shown in FIGS. 5A and 5B may be attributable at least in part to differences in one or more process conditions corresponding to the respective beam spots 202.

In some embodiments, an occlusion zone model may be configured to determine an occlusion zone 500, an inert zone 502, and/or one or more occlusion boundaries 504, with reference to a probability value and/or with references to a confidence interval. For example, an occlusion zone 500 may include, and/or an occlusion boundary 504 may delineate, a region of a build plane 128 may be predicted to be at least partially occluded by a fume plume 200 to with a specified likelihood, such as at least a 1% likelihood, such as at least a 5% likelihood, such as at least a 10% likelihood, such as at least a 50% likelihood, such as at least a 75% likelihood, such as at least a 90% likelihood, such as at least a 95% likelihood, or such as at least a 99% likelihood of being at least partially occluded by a fume plume 200. Additionally, or in the alternative, an inert zone 502 may include, and/or an occlusion boundary 504 may delineate, a region of a build plane 128 predicted to be free from occlusion by a fume plume 200 with a specified likelihood, such as at least a 90% likelihood, such as at least a 95% likelihood, or such as at least a 99% likelihood of being free from occlusion by a fume plume 200. Additionally, or in the alternative, an occlusion zone 500 and/or an inert zone 502 may be determined to within at least a 90% confidence interval, such as at least a 95% confidence interval, or such as at least a 99% confidence interval.

Figure 6A:
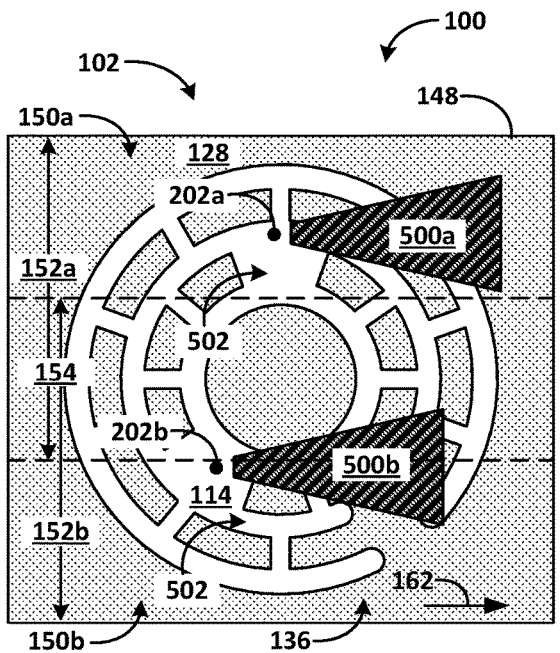
FIGS. 6A-6C respectively show exemplary occlusion zones with respect to one or more regions of a build plane corresponding to respective ones of a plurality of energy beams.
Figure 6B:
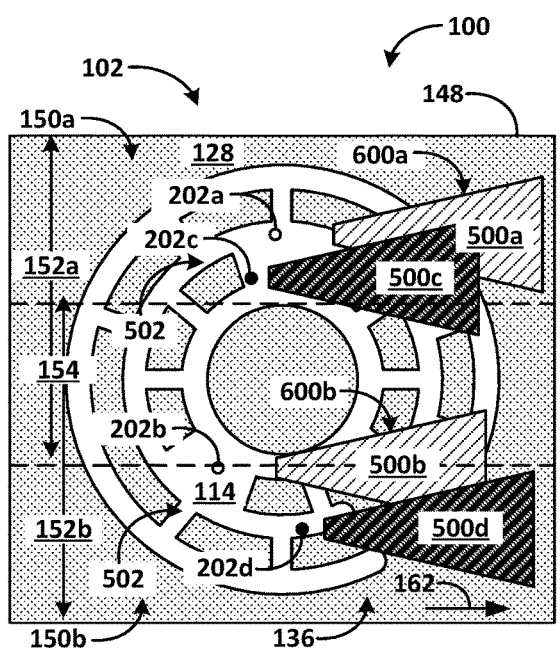
Figure 6C:
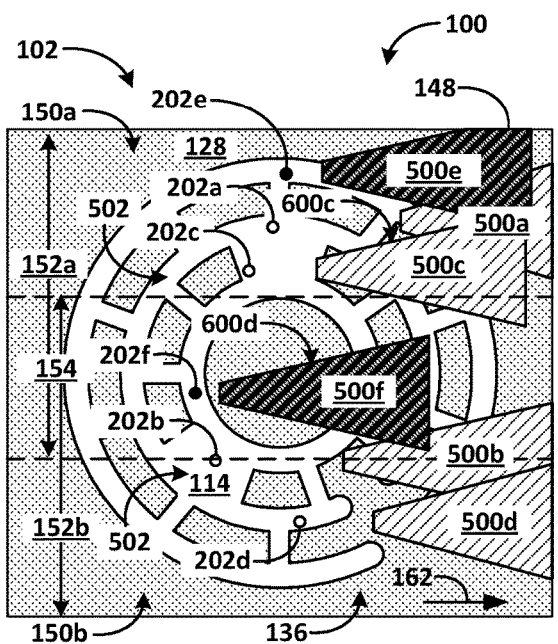

Referring now to FIGS. 6A-6C, exemplary occlusion zones 500 and exemplary inert zones 502 are further described. As shown in FIGS. 6A-6C, an occlusion zone model may be configured to determine an occlusion zone 500 and/or an inert zone 502 with respect to one or more regions of a build plane 128, such as with respect to a first build plane region 152a corresponding to a first scan field 150a within which a first energy beam 134a from a first irradiation device 138a may be scannable, and/or with respect to a second build plane region 152b corresponding to a second scan field 150b within which a second energy beam 134b from a second irradiation device 138b may be scannable. Additionally, or in the alternative, an occlusion zone 500 and/or an inert zone 502 may be determined with respect to an interlace region 154 representing an overlapping portion of the first build plane region 152a and the second build plane region 152b. As shown in FIGS. 6A-6C, the location and/or dimensions of one or more occlusion zones 500 may change over time. Respective portions of the build plane 128 may be irradiated according to an irradiation sequence that includes irradiating different regions of the build plane 128 while avoiding occlusion zones 500, such as by irradiating within a corresponding inert zone 502.

By way of example, FIG. 6A shows a first occlusion zone 500a corresponding to a first beam spot 202a from a first energy beam 134a and a second occlusion zone 500b corresponding to a second beam spot 202b from a second energy beam 134b. As shown, the first occlusion zone 500a may be located within the first build plane region 152a, for example, without overlapping into the interlace region 154. Subsequent irradiation within the first build plane region 152a, by the first energy beam 134a from the first irradiation device 138a, may be performed in an inert zone 502 determined, for example, based at least in part on a location and/or one or more dimensions of the first occlusion zone 500a. Also as shown, the second occlusion zone 500b may be located partially within the second build plane region 152b and partially within the interlace region 154. Subsequent irradiation within the second build plane region 152b, by the second energy beam 134b from the second irradiation device 138b, may be performed in an inert zone 502 determined, for example, based at least in part on a location and/or one or more dimensions of the second occlusion zone 500b. Additionally, or in the alternative, subsequent irradiation within the interlace region 154, by the first energy beam 134a from the first irradiation device 138a and/or by the second energy beam 134b from the second irradiation device 138b, may be performed in an inert zone 502 determined, for example, based at least in part on a location and/or one or more dimensions of the second occlusion zone 500b, such as with respect to the portion of the second occlusion zone 500b located within the interlace region 154.

By way of further example, FIG. 6B shows the first occlusion zone 500a and the second occlusion zone 500b having propagated downstream at a time after irradiating the first beam spot 202a and/or the second beam spot 202b. Subsequent irradiation with the first energy beam 134a and/or the second energy beam 134b may be determined based at least in part on the location of the first occlusion zone 500a and/or the second occlusion zone 500b at the respective time of such subsequent irradiation. For example, a third beam spot 202c may be generated in an inert zone 502 within the first build plane region 152a by a first energy beam 134a from the first irradiation device 138a. The location of the third beam spot 202c may be determined based at least in part on a location of the first occlusion zone 500a. Irradiation of the third beam spot 202c may provide a third occlusion zone 500c. As shown, the third occlusion zone 500c may be located partially within the first build plane region 152a and partially within the interlace region 154. Subsequent irradiation within the first build plane region 152a, by a first energy beam 134a from the first irradiation device 138a, may be performed in an inert zone 502 determined, for example, based at least in part on a location and/or one or more dimensions of the first occlusion zone 500a and/or of the third occlusion zone 500c.

In some embodiments, an occlusion zone model may be configured to determine an aggregate occlusion zone 600. For example, as shown in FIG. 6B, an occlusion zone model may be configured to determine a location and/or one or more dimensions of a first aggregate occlusion zone 600a that includes a plurality of occlusion zones 500, such as the first occlusion zone 500a and the third occlusion zone 500c. Subsequent irradiation within the first build plane region 152a may be determined based at least in part on the location and/or the one or more dimensions of the first aggregate occlusion zone 600a. Additionally, or in the alternative, subsequent irradiation within the interlace region 154, by the first energy beam 134a from the first irradiation device 138a and/or by the second energy beam 134b from the second irradiation device 138b, may be performed in an inert zone 502 determined based at least in part on the location and/or one or more dimensions of the second occlusion zone 500b and/or of the third occlusion zone 500c, such as with respect to the portion thereof located within the interlace region 154.

By way of further example, a fourth beam spot 202d may be generated in an inert zone 502 within the second build plane region 152b by a second energy beam 134b from the second irradiation device 138b. The location of the fourth beam spot 202d may be determined based at least in part on a location of the second occlusion zone 500b. Irradiation of the fourth beam spot 202d may provide a fourth occlusion zone 500d. As shown, the fourth occlusion zone 500d may be located within the second build plane region 152b, for example, without overlapping into the interlace region 154. Subsequent irradiation within the second build plane region 152b, by a second energy beam 134b from the second irradiation device 138b, may be performed in an inert zone 502 determined based at least in part on the location and/or one or more dimensions of the second occlusion zone 500b and/or of the fourth occlusion zone 500d. For example, such subsequent irradiation within the second build plane region 152b may be determined based at least in part on the location and/or one or more dimensions of a second aggregate occlusion zone 600b that includes a plurality of occlusion zones 500, such as the second occlusion zone 500b and the fourth occlusion zone 500d.

By way of further example, FIG. 6C shows the first aggregate occlusion zone 600a and the second aggregate occlusion zone 600b having propagated downstream at a time after irradiating the third beam spot 202c and/or the fourth beam spot 202d. Subsequent irradiation with the first energy beam 134a and/or the second energy beam 134b may be determined based at least in part on the location of the first occlusion zone 500a, the second occlusion zone 500b, the third occlusion zone 500c, and/or the fourth occlusion zone 500d at the respective time of such subsequent irradiation. Additionally, or in the alternative, subsequent irradiation with the first energy beam 134a and/or the second energy beam 134b may be determined based at least in part on the location of the first aggregate occlusion zone 600a and/or the second aggregate occlusion zone 600b at the respective time of such subsequent irradiation.

For example, a fifth beam spot 202e may be generated in an inert zone 502 within the first build plane region 152a by a first energy beam 134a from the first irradiation device 138a. The location of the fifth beam spot 202e may be determined based at least in part on a location of the first aggregate occlusion zone 600a, and/or at least one of the first occlusion zone 500a and the third occlusion zone 500c. Irradiation of the fifth beam spot 202e may provide a fifth occlusion zone 500e. As shown, the fifth occlusion zone 500e may be located within the first build plane region 152a, for example, without overlapping into the interlace region 154. Subsequent irradiation within the first build plane region 152a, by a first energy beam 134a from the first irradiation device 138a, may be performed in an inert zone 502 determined based at least in part on the location and/or one or more dimensions of the first occlusion zone 500a, the third occlusion zone 500c, and/or the fifth occlusion zone 500e. For example, such subsequent irradiation within the first build plane region 152a may be determined based at least in part on the location and/or one or more dimensions of a third aggregate occlusion zone 600c that includes a plurality of occlusion zones 500, such as the first occlusion zone 500a, the third occlusion zone 500c, and the fifth occlusion zone 500e.

By way of further example, a sixth beam spot 202f may be generated in an inert zone 502 within the second build plane region 152b by a second energy beam 134b from the second irradiation device 138b. The location of the sixth beam spot 202f may be determined based at least in part on a location of the second aggregate occlusion zone 600b, and/or at least one of the second occlusion zone 500b and the fourth occlusion zone 500d. Irradiation of the sixth beam spot 202f may provide a sixth occlusion zone 500f As shown, the sixth occlusion zone 500f may be located within the second build plane region 152b, for example, entirely within the interlace region 154. Subsequent irradiation within the second build plane region 152b, by a second energy beam 134b from the second irradiation device 138b, may be performed in an inert zone 502 determined based at least in part on the location and/or one or more dimensions of the second occlusion zone 500b, the fourth occlusion zone 500d, and/or the sixth occlusion zone 500f For example, such subsequent irradiation within the second build plane region 152b may be determined based at least in part on the location and/or one or more dimensions of a fourth aggregate occlusion zone 600d that includes a plurality of occlusion zones 500, such as the second occlusion zone 500b, the fourth occlusion zone 500d, and the sixth occlusion zone 500f. Additionally, or in the alternative, subsequent irradiation within the interlace region 154, by the first energy beam 134a from the first irradiation device 138a and/or by the second energy beam 134b from the second irradiation device 138b, may be performed in an inert zone 502 determined based at least in part on the location and/or one or more dimensions of the second occlusion zone 500b, the third occlusion zone 500c, and/or the sixth occlusion zone 500f, such as with respect to the portion thereof located within the interlace region 154.

Referring now to FIGS. 7A-7D, exemplary irradiation sequences will be further described. Exemplary irradiation sequences may be configured to avoid an occlusion zone 500 and/or to remain within an inert zone 502. An irradiation sequence may be determined based at least in part on an irradiation sequence model. An irradiation sequence model may be configured to determine one or more features of a sequences for selectively consolidating a powder material 118, such as respective ones of a plurality of layers 700 of powder material 118, to form a three-dimensional object 114. An irradiation sequence model may be configured to determine a sequence for consolidating respective ones of a plurality of layers 700 of powder material 118 based at least in part on an occlusion zone model and/or a fume plume model. An irradiation sequence model may be configured to determine an irradiation sequence for a plurality of irradiation devices 138, such as for respective ones of a plurality of energy beams 134 emitted by corresponding ones of the plurality of irradiation devices 138. The irradiation sequence for a respective layer 700 may include instructions for an energy beam system 132 configured to direct the energy beams 134 from the respective irradiation devices 138 to specified locations of the build plane 128 to selectively consolidate the portion of the powder bed 136 corresponding to the object 114. An irradiation sequence may be determined based at least in part on predicted location of one or more fume plumes 200 emitted from a powder material 118 when irradiated by one or more energy beams 134, such as based at least in part on an occlusion zone model. An irradiation sequence model, and/or one or more irradiation sequences determined by an irradiation sequence model, may be generated and/or updated, modified, adjusted, or the like from time to time, including, for example, periodically, in connection with a calibration sequence, a change to an additive manufacturing machine 102 or operation thereof, and/or in real-time.

The irradiation sequence for selectively consolidating a respective layer 700 of powder material 118 may be configured such that the plurality of energy beams 134 irradiate the respective layer 700 while avoiding occlusion zones 500 generated by one or more of the energy beams 134. For example, a first energy beam 134a may avoid a first occlusion zone 500a corresponding to a first beam spot 202a generated by the first energy beam 134a and/or a second occlusion zone 500b corresponding to a second beam spot 202b generated by a second energy beam 134b. Additionally, or in the alternative, the second energy beam 134b may avoid the first occlusion zone 500a corresponding the first energy beam 134a and/or the second occlusion zone 500b corresponding to the second energy beam 134b. In some embodiments, an irradiation sequence for a respective layer 700 of powder material 118 may be configured to such that the plurality of energy beam 134 irradiate the layer 700 while remaining outside of occlusion zones 500. For example, the plurality of energy beams 134 may remain outside of aggregate occlusion zones 600. Additionally, or in the alternative, the plurality of energy beams 134 may remain within an inert zone 502 when irradiating a respective layer 700 of powder material 118.

An exemplary irradiation sequence model may be configured to determine a plurality of scan areas 702 for a respective layer 700 of powder material 118 and/or for respective ones of a plurality of layers 700 of powder material 118. The plurality of scan areas 702 may be determined based at least in part on predicted location of one or more fume plumes 200 emitted from a powder material 118 when irradiated by one or more energy beams 134, such as based at least in part on an occlusion zone model. The plurality of scan areas may be assigned to one or more of a plurality of energy beams 134 and/or to one or more of a plurality of irradiation devices 138. For example, a respective scan area 702 may be irradiated by a first energy beam 134a, by a second energy beam 134b, or by both the first energy beam 134a and the second energy beam 134b. Additionally, or in the alternative, a respective scan area 702 may be irradiated by a first irradiation device 138a, by a second irradiation device 138b, or by both the first irradiation device 138a and the second irradiation device 138b.

In some embodiments, as shown, the plurality of scan areas 702 may be configured and arranged in the form of patches 704. The patches 704 may include symmetric or asymmetric regions of the scan area 702. The plurality of patches 704 may interlock with adjacent patches 704, such as adjacent patches 704 from one or more of the scan areas 702. A plurality of patches 704 may be allocated to a respective one of the plurality of scan areas 702. The plurality of scan areas 702 may be irradiated in a predetermined sequence. An irradiation sequence may include a sequence for irradiating respective ones of a plurality of scan areas 702, such as scan areas 702 respectively including a plurality of patches 704, with a plurality of energy beams 134 and/or irradiation devices 138. Additionally, or in the alternative, the patches 704 may be irradiated in a predetermined sequence. For example, the patches 704 allocated to a respective scan area 702 may be irradiated in a predetermined sequence, and the respective ones of the plurality of scan areas 702 may be irradiated in a predetermined sequence. In some embodiments, the patches 704 may be arranged in rows 706, as shown, for example, in FIG. 7A. The rows may be symmetric or asymmetric. For example, the rows may include a one or more patches 704, and the one or more patches 704 may have symmetric or asymmetric geometry, and/or the one or more patches 704 may be symmetric or asymmetric relative to one another. Additionally, or in the alternative, a row may include a plurality of patches 704 that interlock with adjacent patches 704, such as adjacent patches from another scan area 702.

Figure 7A:
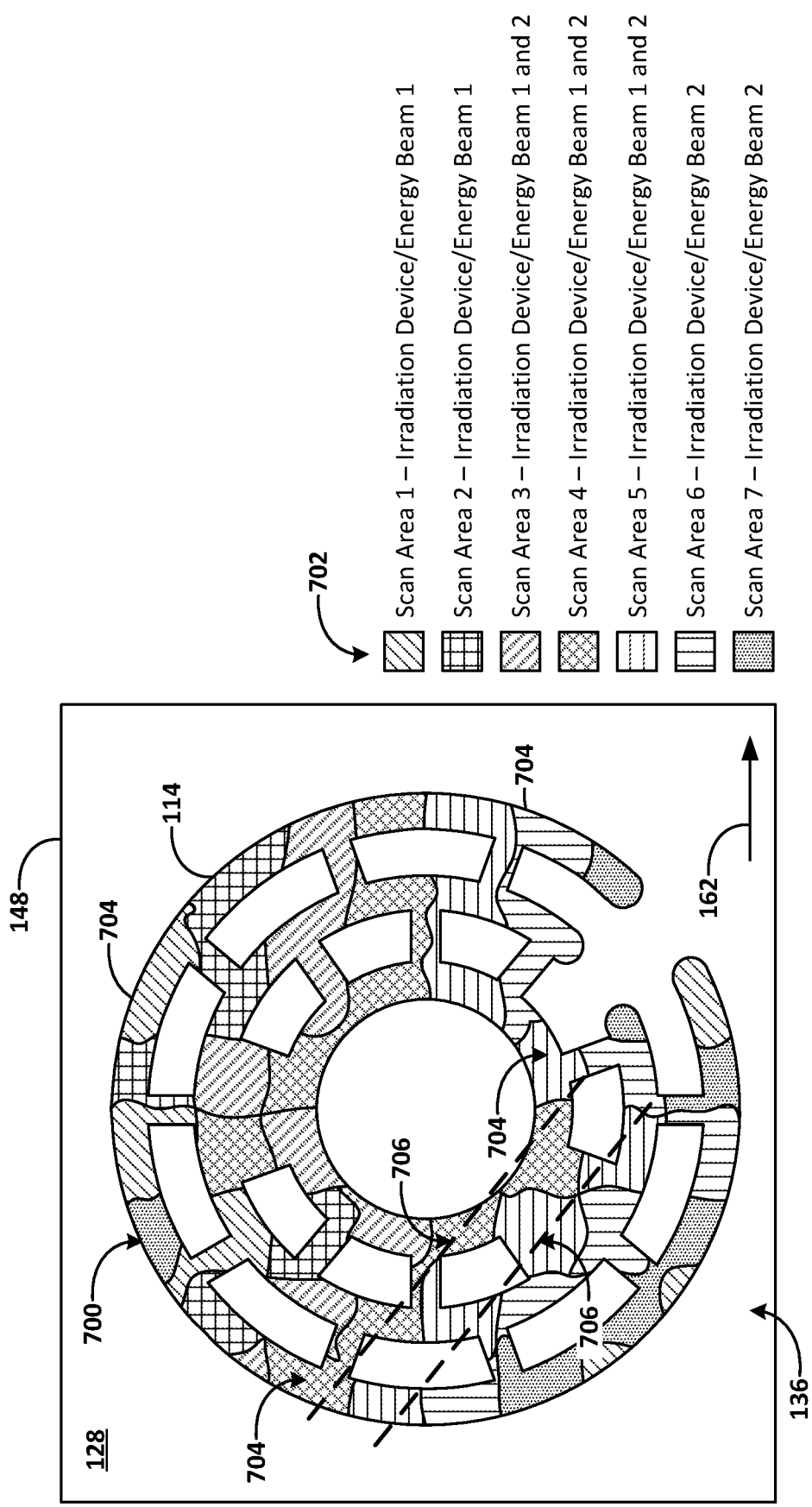
FIG. 7A-7D schematically depict features of exemplary irradiation sequences for selectively consolidating a powder material while avoiding an occlusion zone.
Figure 7B:
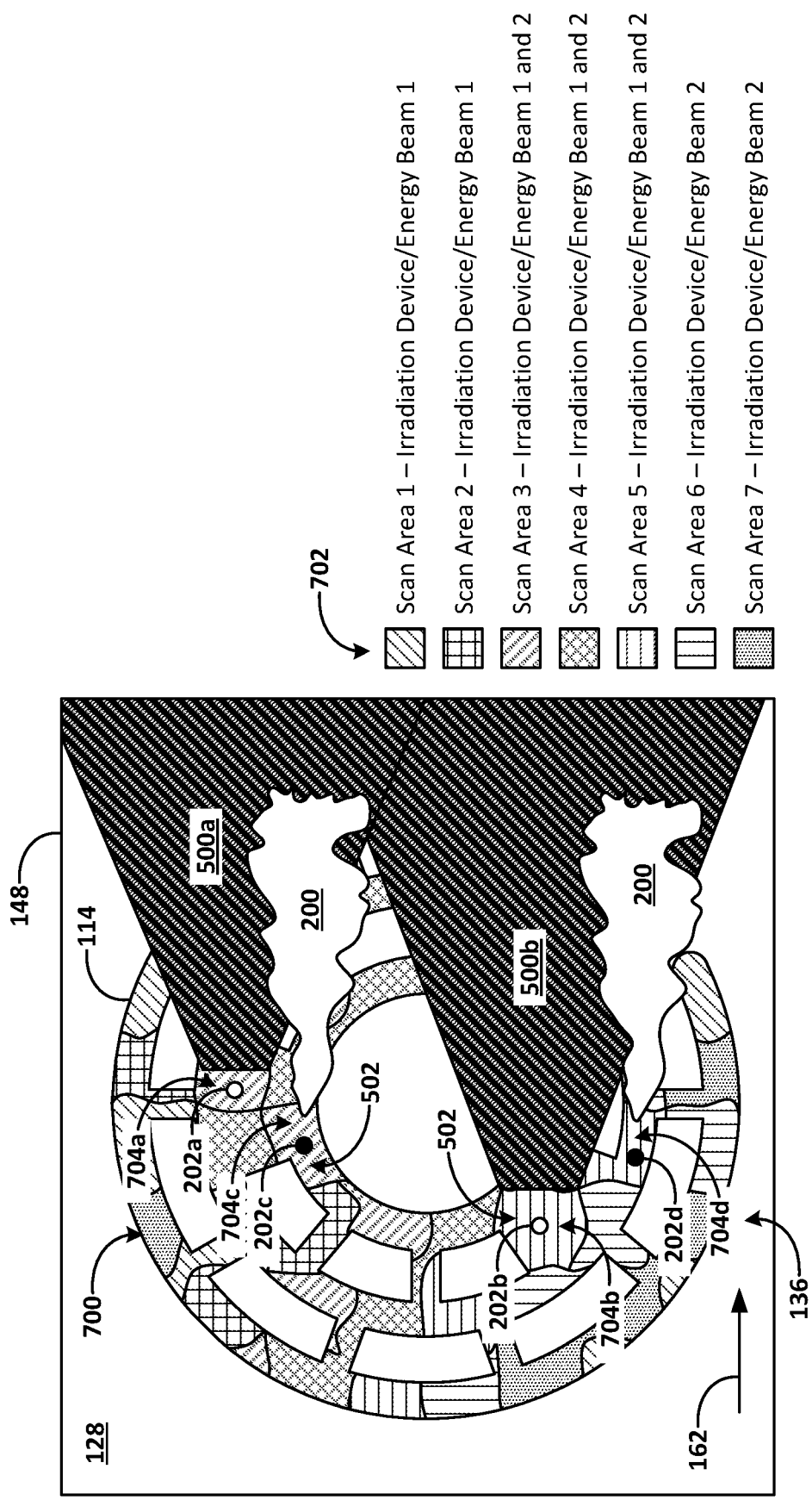

As shown, for example, in FIG. 7B, an irradiation sequence may include irradiating at least a portion of a first patch 704a with a first energy beam 134a, for example, generating a first beam spot 202a within the first patch 704a, and irradiating at least a portion of a second patch 704b with a second energy beam 134b, for example, generating a second beam spot 202b. The irradiation within the first patch 704a and second patch 704b may be performed in an inert zone 502. For example, the first energy beam 134a and the second energy beam 134b may respectively avoid a first occlusion zone 500a corresponding to the first patch 704a and a second occlusion zone 500b corresponding to the second patch 704b. The irradiation sequence may additionally or alternatively include irradiating at least a portion of a third patch 704c with the first energy beam 134a, for example, generating a third beam spot 202c within the third patch 704c, and irradiating at least a portion of a fourth patch 704d with the second energy beam 134b, for example, generating a fourth beam spot 202d. The irradiation within the third patch 704c and fourth patch 704d may be performed in an inert zone 502. For example, the first energy beam 134a and the second energy beam 134b may respectively avoid the first occlusion zone 500a corresponding to the first patch 704a and the second occlusion zone 500b corresponding to the second patch 704b.

Additionally, or in the alternative, the first energy beam 134a and the second energy beam 134b may respectively avoid subsequent occlusion zones 500 corresponding to the third patch 704c and fourth patch 704d. In some embodiments, an irradiation sequence may include completing irradiation within the first patch 704a prior to commencing irradiation within the third patch 704c, and/or completing irradiation within the second patch 704b prior to commencing irradiation within the fourth patch 704d. Alternatively, in some embodiments, an irradiation sequence may include cycling through a sequence of patches 704 and/or alternating between patches 704. For example, an irradiation sequence may include a sequence for the first energy beam 134a that includes the first patch 704a followed by the third patch 704c, or vice versa, and/or alternating between the first patch 704a and the third patch 704c. Additionally, or in the alternative, the irradiation sequence may include a sequence for the second energy beam 134b that includes the second patch 704b followed by the fourth patch 704d, or vice versa, and/or alternating between the second patch 704b and the fourth patch 704d.

Figure 7C:
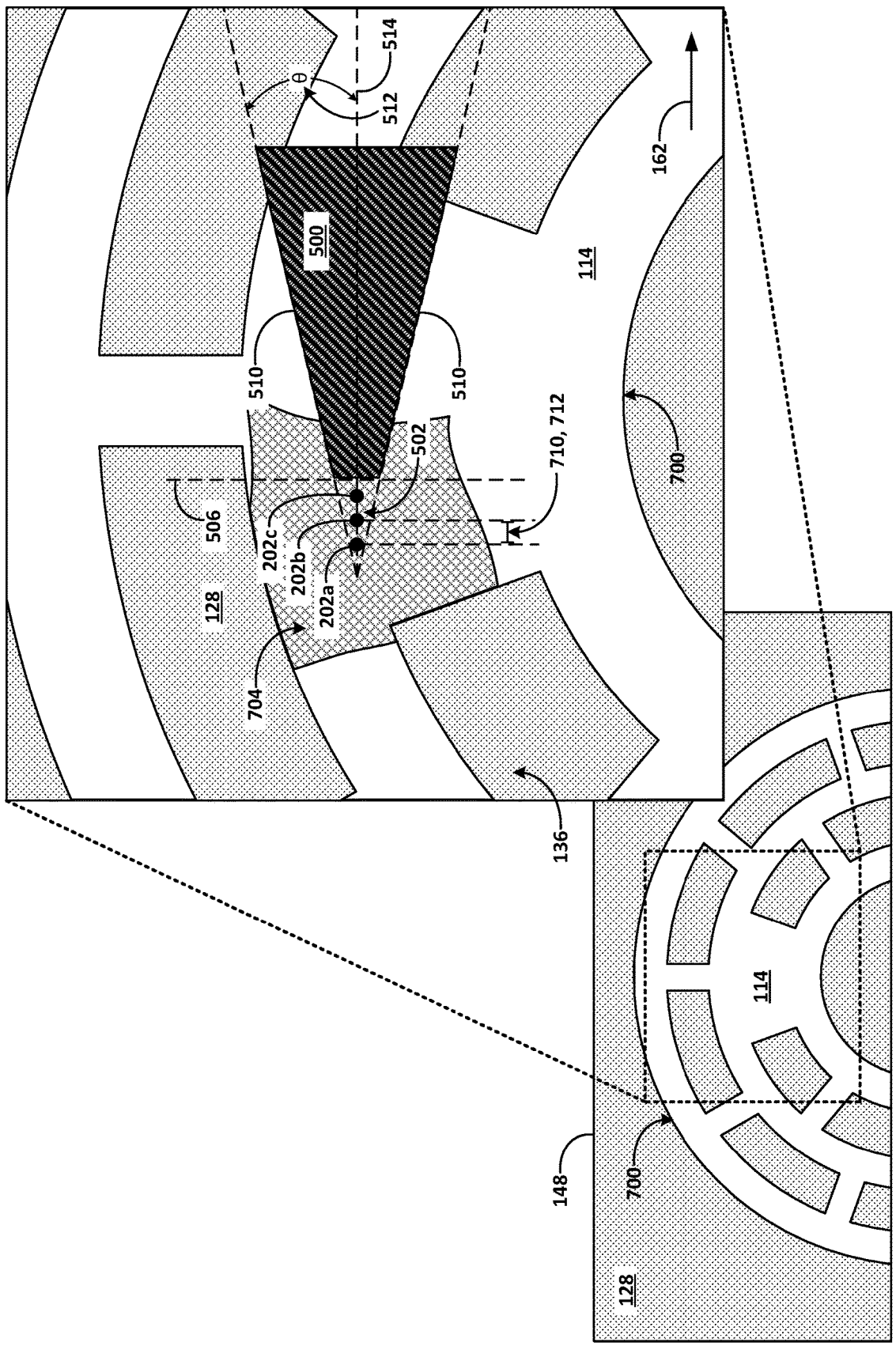
Figure 7D:
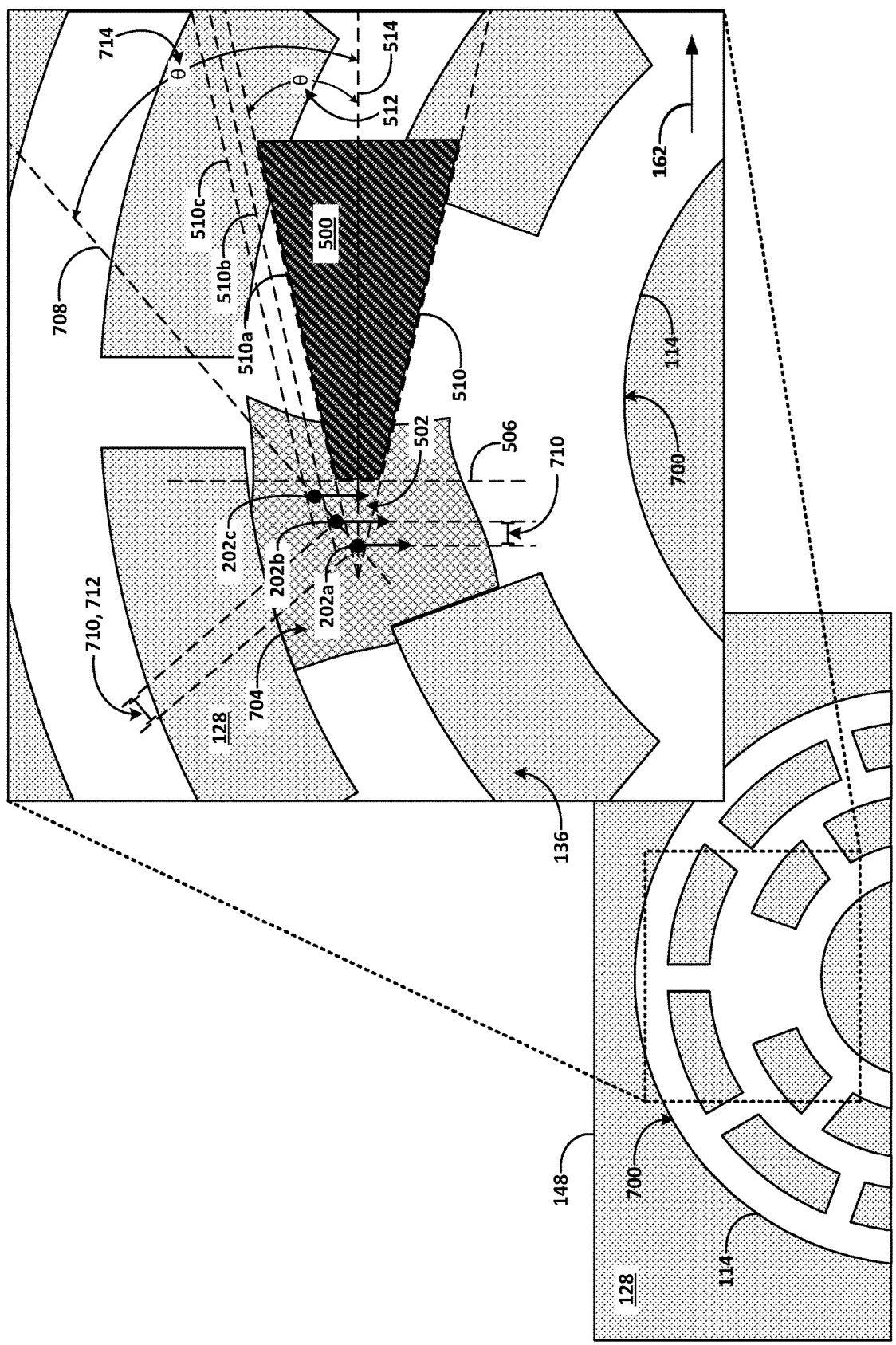

Referring now to FIGS. 7C and 7D, in some embodiments, an irradiation sequence for a respective layer 700 of powder material 118 may include irradiating a build plane 128 with a plurality of energy beams 134 concurrently generating respective beam spots 202 in close proximity to one another while still remaining outside of respective occlusion zones 500 corresponding to respective beam spots 202. Respective ones of the plurality of beam spots 202 may be concurrently generated during at least partially overlapping time intervals. In some embodiments, a plurality of beam spots 202 corresponding to respective ones of a plurality of energy beams 134 may be located on a laterally congruent side of a lateral occlusion boundary 510 relative to an occlusion zone 500. Additionally, or in the alternative, the plurality of beam spots 202 corresponding to respective ones of a plurality of energy beams 134 may be located between a first lateral occlusion boundary 510 and a second lateral occlusion boundary 510, such as between a first and a second lateral occlusion boundary 510 that define respective lateral boundaries of a corresponding occlusion zone 500. Additionally, or in the alternative, the plurality of beam spots 202 corresponding to respective ones of a plurality of energy beams 134 may be located upstream from an upstream occlusion boundary 506 that transects one or more corresponding lateral occlusion boundaries 510, such as the first and second lateral occlusion boundary 510.

By way of example, as shown in FIG. 7C, a first beam spot 202a, a second beam spot 202b, and a third beam spot 202c, may be located on a laterally congruent side of a lateral occlusion boundary 510 relative to an occlusion zone 500, such as between a first and a second lateral occlusion boundary 510 that define respective lateral boundaries of a corresponding occlusion zone 500. The first beam spot 202a, the second beam spot 202b, and the third beam spot 202c, may be upstream from an upstream occlusion boundary 506 that transects one or more corresponding lateral occlusion boundaries 510. The first beam spot 202a, the second beam spot 202b, and the third beam spot 202c, may be respectively formed by corresponding ones of a plurality of energy beams 134 emitted by corresponding ones of a plurality of irradiation devices 138.

As another example, as shown in FIG. 7D, in some embodiments, a plurality of concurrently generated beam spots 202 that are in close proximity to one another corresponding to respective ones of a plurality of energy beams 134 may be laterally offset from one another, such as relative to a lateral axis 514 of the build plane 128 oriented parallel to a direction of flow of inert process gas 162. The lateral offset as between respective beam spots 202 may locate at least one of the respective beam spots 202 on a laterally obverse side of a lateral occlusion boundary 510 with respect to an occlusion zone 500 corresponding to at least another of the respective beam spots 202. Additionally, or in the alternative, the plurality of beam spots 202 corresponding to respective ones of a plurality of energy beams 134 may be located on a laterally congruent side of a first lateral occlusion boundary 510 and a laterally obverse side of a second lateral occlusion boundary 510, such as first and second lateral occlusion boundary 510 that define respective lateral boundaries of a corresponding occlusion zone 500. Additionally, or in the alternative, the plurality of beam spots 202 corresponding to respective ones of a plurality of energy beams 134 may be located upstream from an upstream occlusion boundary 506 that transects one or more corresponding lateral occlusion boundaries 510, such as the first and second lateral occlusion boundary 510.

By way of example, as shown in FIG. 7D, a first beam spot 202a may be located on a laterally congruent side of a first lateral occlusion boundary 510a, and a second beam spot 202b may be located on a laterally obverse side of the first lateral occlusion boundary 510a. The second beam spot 202b may be located on a laterally congruent side of a second lateral occlusion boundary 510b. Additionally, or in the alternative, a third beam spot 202c may be located on a laterally obverse side of the second lateral occlusion boundary 510b. The third beam spot 202c may be located on a laterally congruent side of a third lateral occlusion boundary 510c. The first beam spot 202a, the second beam spot 202b, and the third beam spot 202c, may be upstream from an upstream occlusion boundary 506 that transects one or more corresponding lateral occlusion boundaries 510, such as the first lateral occlusion boundary 510a, the second lateral occlusion boundary 510b, and/or the third lateral occlusion boundary 510c. The first beam spot 202a, the second beam spot 202b, and the third beam spot 202c, may be respectively formed by corresponding ones of a plurality of energy beams 134 emitted by corresponding ones of a plurality of irradiation devices 138.

In some embodiments, a plurality of concurrently generated beam spots 202 may be oriented along a pitch line 708. The pitch line 708 may be oblique to a direction of flow of inert process gas 162. For example, the pitch line 708 may transect a lateral axis 514 of the build plane 128 oriented parallel to a direction of flow of inert process gas 162. The pitch line 708 may have a lateral offset pitch 714 relative to the lateral axis 514 of the build plane 128. The lateral offset pitch 714 may exceed a lateral pitch 512 of one or more lateral occlusion boundaries 510 corresponding to respective ones of the plurality of beam spots 202.

Referring still to FIGS. 7C and 7D, in some embodiments, a spacing between respective ones of a plurality of concurrently generated beam spots 202 corresponding to respective ones of a plurality of energy beams 134 may have a maximum distance 710 corresponding to a scan vector spacing utilized to irradiate the build plane 128, such as a respective scan area 702. For example, a ratio of the maximum distance 710 between respective ones of the plurality of beam spots 202 and the scan vector spacing utilized to irradiate the build plane 128 may be about 1:1. Additionally, or in the alternative, the ratio of the maximum distance 710 between respective ones of the plurality of beam spots 202 and the scan vector spacing utilized to irradiate the build plane 128 may be from about 10:1 to about 1:1, such as from about 5:1 to about 1:1, such as from about 3:1 to about 1:1, or such as from about 2:1 to about 1:1. In some embodiments, as shown in FIG. 7C, the maximum distance 712 may correspond to a lateral offset along the lateral axis 514. In some embodiments, as shown in FIG. 7D, the maximum distance 712 may correspond to the pitch line 708.

In some embodiments, the spacing between respective ones of a plurality of concurrently generated beam spots 202 corresponding to respective ones of a plurality of energy beams 134 may correspond to a cross-sectional width of a consolidation zone, such as a melt pool, a sintering region, or the like, generated by the respective beam spots 202. For example, a ratio of the maximum distance 710 between respective ones of the plurality of beam spots 202 and the cross-sectional width of the consolidation zone generated by the respective beam spots 202 may be about 1:1. Additionally, or in the alternative, the ratio of the maximum distance 710 between respective ones of the plurality of beam spots 202 and the cross-sectional width of the consolidation zone generated by the respective beam spots 202 may be from about 50:1 to about 0.1:1, such as from about 10:1 to about 0.1:1, such as from about 4:1 to about 0.4:1, such as from about 3:1 to about 0.4:1, or such as from about 2:1 to about 0.4:1, or such as from about 1:1 to about 0.1:1, or such as from about 0.9:1 to about 0.3:1.

Referring still to FIGS. 7C and 7D, in some embodiments, a plurality of concurrently generated beam spots 202 corresponding to respective ones of a plurality of energy beams 134 may be concurrently located on a laterally congruent side of a lateral occlusion boundary 510 relative to an occlusion zone 500. For example, as shown in FIG. 7C, the plurality of beam spots 202 may be concurrently located between a first lateral occlusion boundary 510 and a second lateral occlusion boundary 510, such as between a first and a second lateral occlusion boundary 510 that define respective lateral boundaries of a corresponding occlusion zone 500. Additionally, or in the alternative, in some embodiments, a plurality of concurrently generated beam spots 202 corresponding to respective ones of a plurality of energy beams 134 may be sequentially traverse a lateral occlusion boundary 510 relative to an occlusion zone 500, such as from a laterally obverse side of the lateral occlusion boundary 510 to a laterally congruent side of the lateral occlusion boundary 510. For example, as shown in FIG. 7D, the plurality of beam spots 202 may sequentially traverse a first lateral occlusion boundary 510a. The plurality of beam spots 202 may remain upstream of an upstream occlusion boundary 506 when being concurrently located on a laterally congruent side of a lateral occlusion boundary 510 and/or when sequentially traversing the lateral occlusion boundary 510.

It will be appreciated that respective beam spots 202 may propagate along a scan vector oriented in any desired direction that avoids one or more occlusion zones 500. For example, a beam spot 202 may propagate along a scan vector oriented upstream relative to a flow of process gas 162 and thereby remain within an inert zone 502. Additionally, or in the alternative, a propagate along a scan vector oriented downstream relative to a flow of process gas 162 while remaining upstream of an upstream occlusion boundary 506. Additionally, or in the alternative, a beam spot 202 may propagate along a scan vector downstream from an upstream occlusion boundary 506, while remaining on an obverse side of a lateral occlusion boundary 510. Additionally, or in the alternative, a beam spot 202 may propagate along a scan vector downstream of a downstream occlusion boundary 508.

In some embodiments, an irradiation sequence model may be configured to determine an irradiation sequence that includes a good utilization efficiency of an energy beam system 132, such as a utilization efficiency for a plurality of energy beams 134 and/or a plurality of irradiation devices 138, while also avoiding occlusion zones 500 and/or remaining within an inert zone 502. The utilization efficiency may include a utilization percentage representing a percentage of time when a plurality of energy beams 134 and/or a plurality of irradiation devices 138 are concurrently consolidating respective portions of the build plane 128. The plurality of energy beams 134 considered when determining a utilization efficiency for one or more energy beams 134 may include all energy beams 134 available to irradiate a respective layer 700 of powder material 118 corresponding to one or more objects 114 being additively manufactured. The plurality of irradiation devices 138 considered when determining a utilization efficiency for one or more irradiation devices 138 may include all irradiation devices 138 available to irradiate a respective layer 700 of powder material 118 corresponding to one or more objects 114 being additively manufactured. The respective portions of the build plane 128 being concurrently consolidated may include the portion of the respective layer 700 corresponding to the one or more objects 114 being additively manufactured. Additionally, or in the alternative, the utilization efficiency may include a consolidation ratio for respective energy beams 134 and/or irradiation devices 138. The consolidation ratio may represent a proportion of consolidation performed by respective ones of the plurality of energy beams 134 and/or by respective ones of the plurality of irradiation devices 138. The consolidation ratio may include a time-based ratio and/or an energy-based ratio for respective ones of the plurality of energy beams 134 and/or for respective ones of the plurality of irradiation devices 138.

A time-based consolidation ratio may be determined for respective ones of the plurality of energy beams 134 by dividing a product of the utilization time for a respective energy beam 134 and the total number of energy beam 134 by the combined utilization time of the plurality of energy beams 134. A time-based consolidation ratio may be determined for respective ones of the plurality of irradiation devices 138 by dividing a product of the utilization time for a respective irradiation device 138 and the total number of irradiation devices 138 by the combined utilization time of the plurality of irradiation devices 138. For example, the time-based consolidation ratio for a respective irradiation device 138 may be determined using the relationship: $CR\_t = (t \times n)/t\_total$, where ($CR\_t$) is the time-based consolidation ratio, (t) is the time when a respective irradiation device 138 is consolidating a respective portion of the build plane 128, (n) is the number of irradiation devices 138, and ($t\_total$) is the sum of the time, for each of the respective ones of the plurality of irradiation devices 138, when the respective one of the plurality of irradiation device 138 is consolidating a respective portion of the build plane 128. It will be appreciated that the time-based consolidation ratio may differ as between one or more of the respective irradiation devices 138, and/or that the time-based consolidation ratio may be equivalent as between one or more of the respective irradiation devices 138.

An energy-based consolidation ratio may be determined for respective ones of the plurality of energy beams 134 by dividing a product of the quantity of energy output from a respective energy beam 134 and the total number of energy beams 134 by the combined energy output from the plurality of energy beams 134. An energy-based consolidation ratio may be determined for respective ones of the plurality of irradiation devices 138 by dividing a product of the quantity of energy output from a respective irradiation device 138 and the total number of irradiation devices 138 by the combined energy output from the plurality of irradiation devices 138. For example, the energy-based consolidation ratio for a respective irradiation device 138 may be determined using the relationship: $CR\_q = (q \times n)/q\_total$, where ($CR\_q$) is the energy-based consolidation ratio, (q) is the energy output by a respective irradiation device 138 when consolidating a respective portion of the build plane 128, (n) is the number of irradiation devices 138, and ($q\_total$) is the sum of the energy, for each of the respective ones of the plurality of irradiation devices 138, output by the respective one of the plurality of irradiation device 138 when consolidating a respective portion of the build plane 128. It will be appreciated that the energy-based consolidation ratio may differ as between one or more of the respective irradiation devices 138, and/or that the energy-based consolidation ratio may be equivalent as between one or more of the respective irradiation devices 138.

In some embodiments, a utilization percentage for an energy beam system 132, representing a percentage of time when a plurality of energy beams 134 and/or a plurality of irradiation devices 138 are concurrently consolidating respective portions of the build plane 128, may be at least about 75%, such as at least about 80%, such as at least about 90%, such as at least about 95%, or such as at least about 99%.

In some embodiments, a consolidation ratio, such as a time-based consolidation ratio and/or an energy-based consolidation ratio, for respective ones of a plurality of energy beams 134 and/or for respective ones of a plurality of irradiation devices 138 may be from about 0.8 to about 1.2, such as from about 0.9 to about 1.1, such as from about 0.95 to about 1.05, or such as from about 0.99 to about 1.01. Additionally, or in the alternative, a consolidation ratio for respective ones of a plurality of energy beams 134 and/or for respective ones of a plurality of irradiation devices 138 may differ from one another by less than about 20%, such as less than about 10%, such as less than about 5%, or such as less than about 1%.

In some embodiments, a plurality of energy beams 134 and/or a plurality of irradiation devices 138 may selectively consolidate a respective layer 700 or layers 700 of powder material 118 while remaining within an inert zone 502 for at least about 60% of an irradiation sequence utilized to selectively consolidate the respective layer 700 or layers 700, such as for at least about 80% of the irradiation sequence, such as for at least about 90% of the irradiation sequence, such as at least about 95% of the irradiation sequence, or such as at least about 99% of the irradiation sequence when consolidating the respective layer 700 or layers 700. Additionally or in the alternative, respective ones of the plurality of energy beams 134 and/or respective ones of the plurality of irradiation devices 138 may irradiate within an occlusion zone 500 for less than 20% of the irradiation sequence utilized to selectively consolidating a respective layer 700 or layers 700 of powder material 118, such as for less than about 10% of the irradiation sequence, such as for less than about 5% of the irradiation sequence, or such as for less than about 1% of the irradiation sequence when consolidating the respective layer 700 or layers 700. For example, respective ones of the plurality of energy beams 134 and/or respective ones of a plurality of irradiation devices 138 may consolidate a layer 700 or plurality of layers 700 while remaining within an inert zone 502 for at least about such a percentage of the irradiation sequence, and/or while irradiating within an occlusion zone 500 for less than such a percentage of the irradiation sequence, while also maintaining an aforementioned utilization efficiency.

Figure 8A:
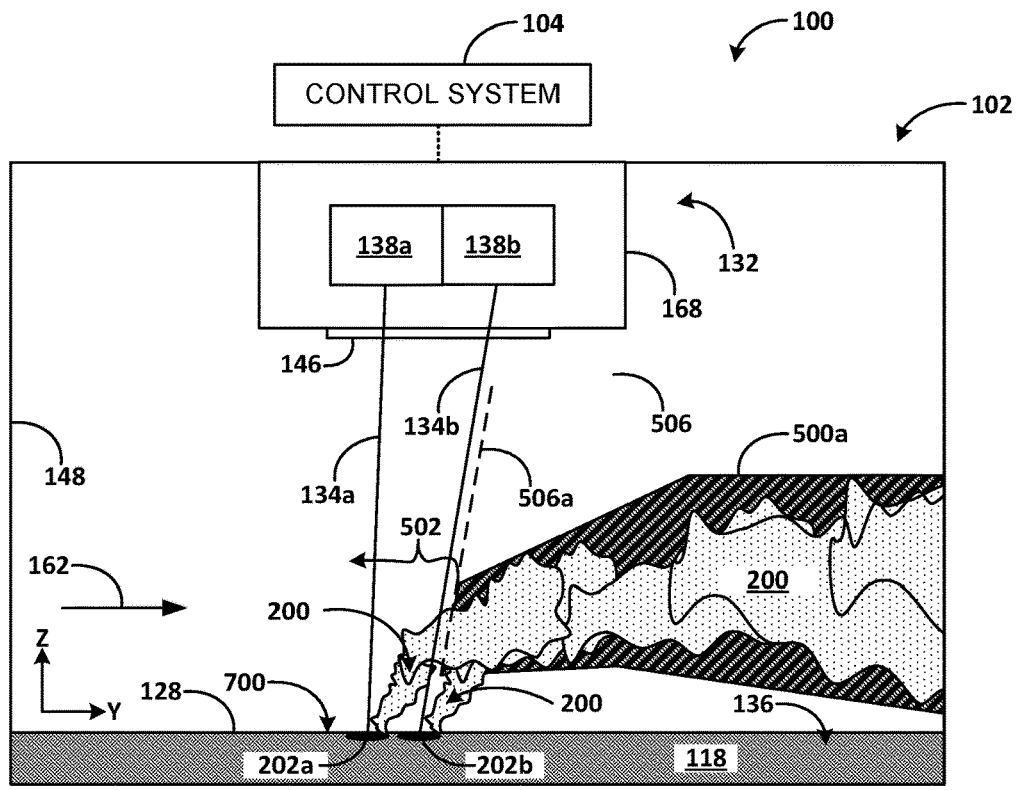
FIGS. 8A and 8B schematically depict features of further exemplary irradiation sequences for selectively consolidating a powder material while avoiding an occlusion zone, with FIG. 8A showing a side view, and FIG. 8B showing a lateral view corresponding to the side view shown in FIG. 8A.
Figure 8B:
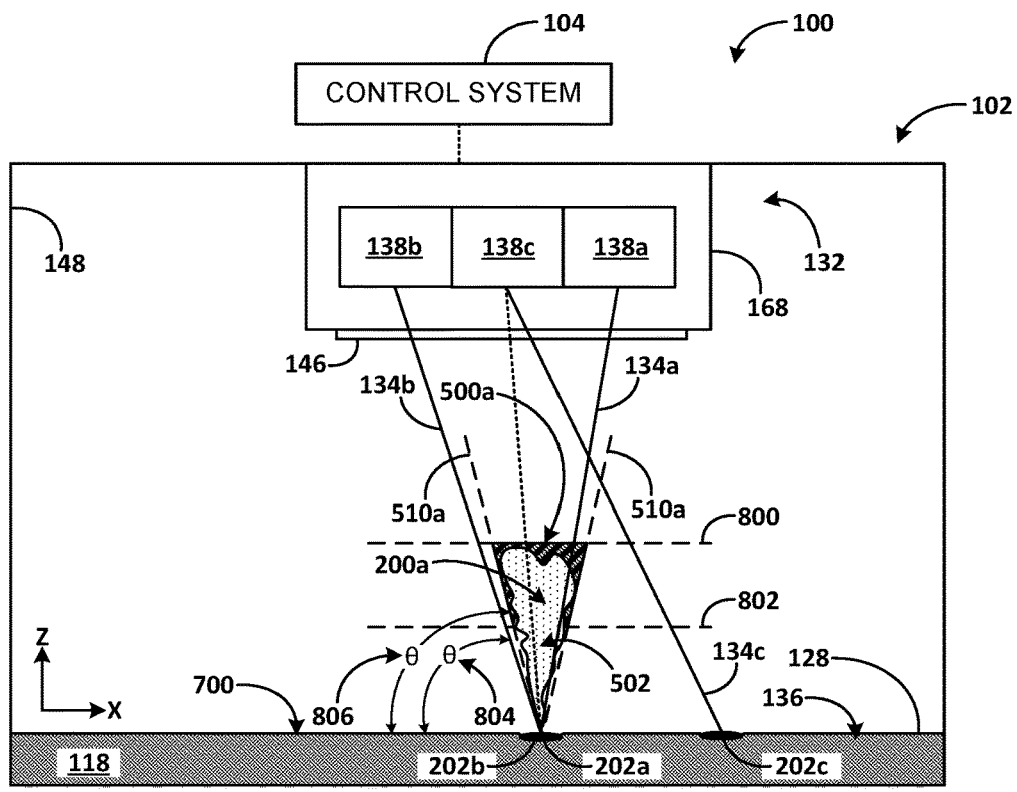

Referring now to FIGS. 8A and 8B, exemplary irradiation sequences are further described. As shown, an irradiation sequence for a respective layer 700 of powder material 118 may include irradiating a build plane 128 with a plurality of energy beams 134 concurrently generating respective beam spots 202 in close proximity to one another while still remaining outside of respective occlusion zones 500 corresponding to respective beam spots 202. In some embodiments, the irradiation sequence depicted in FIGS. 8A and 8B may correspond to the irradiation sequences depicted in FIGS. 7C and 7D.

As further shown in FIGS. 8A and 8B, in some embodiments, a plurality of beam spots 202 corresponding to respective ones of a plurality of energy beams 134 may be located on a laterally congruent side of a lateral occlusion boundary 510 relative to an occlusion zone 500. Additionally, or in the alternative, the plurality of beam spots 202 corresponding to respective ones of a plurality of energy beams 134 may be located between a first lateral occlusion boundary 510 and a second lateral occlusion boundary 510, such as between a first and a second lateral occlusion boundary 510 that define respective lateral boundaries of a corresponding occlusion zone 500.

By way of example, as shown in FIGS. 8A and 8B, a first occlusion zone 500*a* may correspond to a first beam spot 202*a* generated by a first energy beam 134*a*, such as from a first irradiation device 138*a*. A second beam spot 202*b* generated by a second energy beam 134*b*, such as from a second irradiation device 138*b*, may be located upstream from a first upstream occlusion boundary 506*a* corresponding to the first occlusion zone 500*a* (e.g., FIG. 8A). Additionally, or in the alternative, the second beam spot 202*b* may be located on a laterally congruent side of a first lateral occlusion boundary 510*a* corresponding to the first occlusion zone 500*a*, such as first and second lateral occlusion boundary 510*a* that define respective lateral boundaries of the first occlusion zone 500*a* (e.g., FIG. 8B). The first upstream occlusion boundary 506*a* may transect the first and second lateral occlusion boundaries 510*a*.

As shown in FIGS. 8A and 8B, an occlusion zone 500, such as the first occlusion zone 500*a*, may have three dimensions. The dimensions of the occlusion zone 500 may be determined with reference to a coordinate system, for example, with reference to X, Y, and Z coordinates. In some embodiments, an occlusion zone 500, such as the first occlusion zone 500*a*, may include an upper occlusion boundary 800. Additionally, or in the alternative, an inert zone 502 may include an upper occlusion boundary 800. The location of an upper occlusion boundary 800 may correspond to an upper boundary of an occlusion zone 500 and/or a lower boundary of an inert zone 502, for example, in relation to a Z-axis of a coordinate system. The location of an upper occlusion boundary 800 may depend at least in part on a time and/or a time interval corresponding to an irradiation sequence. A fume plume 200 may be predicted to be located beneath an upper occlusion boundary 800, for example, based at least in part on a fume plume model. A region of the process chamber 148 and/or a region of the build plane 128 located below an upper occlusion boundary 800 may be predicted to be at least partially occluded by the fume plume 200. Additionally, or in the alternative, a region of the process chamber 148 and/or a region of the build plane 128 located above the upper occlusion boundary 800 may be predicted to be free from occlusion by the fume plume 200.

In some embodiments, an occlusion zone 500, such as the first occlusion zone 500*a*, may include a lower occlusion boundary 802. Additionally, or in the alternative, an inert zone 502 may include a lower occlusion boundary 802. The location of a lower occlusion boundary 802 may correspond to a lower boundary of an occlusion zone 500 and/or an upper boundary of an inert zone 502. The location of a lower occlusion boundary 802 may depend at least in part on a time and/or a time interval corresponding to an irradiation sequence. A fume plume 200 may be predicted to be located above of a lower occlusion boundary 802, for example, based at least in part on a fume plume model. A region of the process chamber 148 located above the lower occlusion boundary 802, and/or a region of the build plane 128 located below the lower occlusion boundary 802, may be predicted to be at least partially occluded by the fume plume 200, for example, with respect to one or more energy beams 134 and/or irradiation devices 138 of an energy beam system 132. Additionally, or in the alternative, a region of the process chamber 148 and/or a region of the build plane 128 located below the lower occlusion boundary 802 may be predicted to be free from occlusion by the fume plume 200, for example, with respect to one or more energy beams 134 and/or irradiation devices 138 of an energy beam system 132.

As shown in FIGS. 8A and 8B, a second energy beam 134*b* may generate a second beam spot 202*b* located beneath an occlusion zone 500, such as beneath a first occlusion zone 500*a* corresponding to the first beam spot 202*a* generated by the first energy beam 134*a*. The second beam spot 202*b* may be located beneath the occlusion zone 500, such as the first occlusion zone 500*a*, in relation to a lateral axis, such as an X-axis. For example, the second beam spot 202*b* may be located on a laterally congruent side of a first lateral occlusion boundary 510*a* corresponding to the first occlusion zone 500*a*, such between first and second lateral occlusion boundary 510*a* corresponding to the first occlusion zone 500*a*. The location of the first lateral occlusion boundary 510*a* and/or the second lateral occlusion boundary 510*b* may be determined with reference to an intersection of an upper occlusion boundary 800, a lower occlusion boundary 802, and/or a location between the upper occlusion boundary 800 and the lower occlusion boundary 802. The second beam spot 202*b* may be located upstream from the first upstream occlusion boundary 506*a* corresponding to the first occlusion zone 500*a*, for example, in relation to a longitudinal axis, such as the Y-axis.

In some embodiments, an energy beam 134 may generate a beam spot 202 on a region of the build plane 128 located beneath an occlusion zone 500 when the energy beam enters the process chamber 148, such as through the process chamber window 146, from lateral and longitudinal coordinates that are outside of lateral and longitudinal coordinates of an occlusion zone. For example, FIG. 8B shows the second energy beam 134*b* generating a beam spot beneath the first occlusion zone 500*a* corresponding to the first energy beam 134*a*. As shown in FIG. 8B, the second energy beam 134 enters the process chamber 148 at a location that is laterally obverse to the first lateral occlusion boundary 510*a*. As shown in FIG. 8A, the second energy beam 134 enters the process chamber 148 at a location that is upstream to the first upstream occlusion boundary 506*a*. Additionally, or in the alternative, an energy beam 134 may generate a beam spot 202 on a region of the build plane 128 located beneath an occlusion zone 500 when the energy beam 134 has a suitable beam-incidence angle 804 to become incident upon the region of the build plane 128 located beneath the occlusion zone 500 without traversing through the region of the process chamber 148 predicted to be occupied by a fume plume 200. For example, FIG. 8B shows a beam-incidence angle 804 for the second energy beam 134*b*. In some embodiments an occlusion boundary 504 may have an occlusion boundary-incidence angle 806 relative to the build plane 128. For example, FIG. 8B shows an occlusion boundary-incidence angle 806 for a first lateral occlusion boundary 510*a* corresponding to the first occlusion zone 500*a*. In some embodiments, an energy beam 134 may generate a beam spot 202 located beneath an occlusion zone 500 when the energy beam 134 has a beam-incidence angle 804 that is less than a corresponding occlusion boundary-incidence angle 806. For example, as shown in FIG. 8B, the second energy beam 134*b* has a beam-incidence angle 804 that is less than the occlusion boundary-incidence angle 806 corresponding to the first lateral occlusion boundary 510a adjacent to the second energy beam 134b.

Additionally, or in the alternative, a region of the build plane 128 located beneath an occlusion zone 500 may be occluded by the occlusion zone 500, such as with respect to one or more lateral occlusion boundaries 510, with respect to an energy beam 134 that is located within lateral and longitudinal coordinates of an occlusion zone 500. For example, FIG. 8B shows the third irradiation device 138c located within lateral and longitudinal coordinates of the first occlusion zone 500a corresponding to the first energy beam 134a. The region of the build plane 128 located beneath the first occlusion zone 500a with respect to the lateral occlusion boundaries 510 is occluded with respect to a third energy beam 134c emitted by the third irradiation device 138c. In some embodiments, the third energy beam may generate a third beam spot 202c within an inert zone 502 located obverse to an occlusion boundary 504, such as laterally obverse to the first lateral occlusion boundary 510a.

Referring again to FIGS. 5A and 5B, 6A-6C, 7B-7D, 8A and 8B, in some embodiments, an upstream occlusion boundary 506 may be located downstream from a corresponding beam spot 202 as a result of a fume plume 200 propagating downstream. Additionally, or in the alternative, in some embodiments, an occlusion zone 500 may include an upstream occlusion boundary 506 downstream from a corresponding beam spot 202 to the extent that an energy beam 134 is able to generate a beam spot 202 upon the build plane 128 without traversing through the region of the process chamber 148 predicted to be occupied by a fume plume 200. For example, the upstream occlusion boundary 506 may be determined based at least in part on a region of the build plane 128 accessible by an energy beam 134 without traversing through the region of the process chamber 148 predicted to be occupied by a fume plume 200. Additionally, or in the alternative, a downstream occlusion boundary 508 and/or a lateral occlusion boundary 510 may be determined based at least in part on a region of the build plane 128 accessible by an energy beam 134 without traversing through the region of the process chamber 148 predicted to be occupied by a fume plume 200.

In some embodiments, a lateral spread of a fume plume 200 may be relatively small in closed proximity to a beam spot 202. Additionally, or in the alternative, a height of a fume plume 200 may increase relatively steeply in close proximity to a beam spot 202. In some embodiments, a region of the build plane 128 and/or the process chamber 148 that has a relatively close proximity to the beam spot 202 may be unoccupied by an occlusion zone 500 at least in part due to a relatively low probability of such region being occluded by a fume plume 200. The relatively low probability of a being occluded by a fume plume 200 at such a region in relatively close proximity to the beam spot 202 may be attributable at least in part to a relatively small lateral spread of the fume plume 200 and/or a relatively steep increase in height of a fume plume 200 in closed proximity to the beam spot 202. In some embodiments, an inert zone 502 may include a region of the build plane 128 and/or a region of the process chamber 148 located downstream from a beam spot 202.

Figure 9:
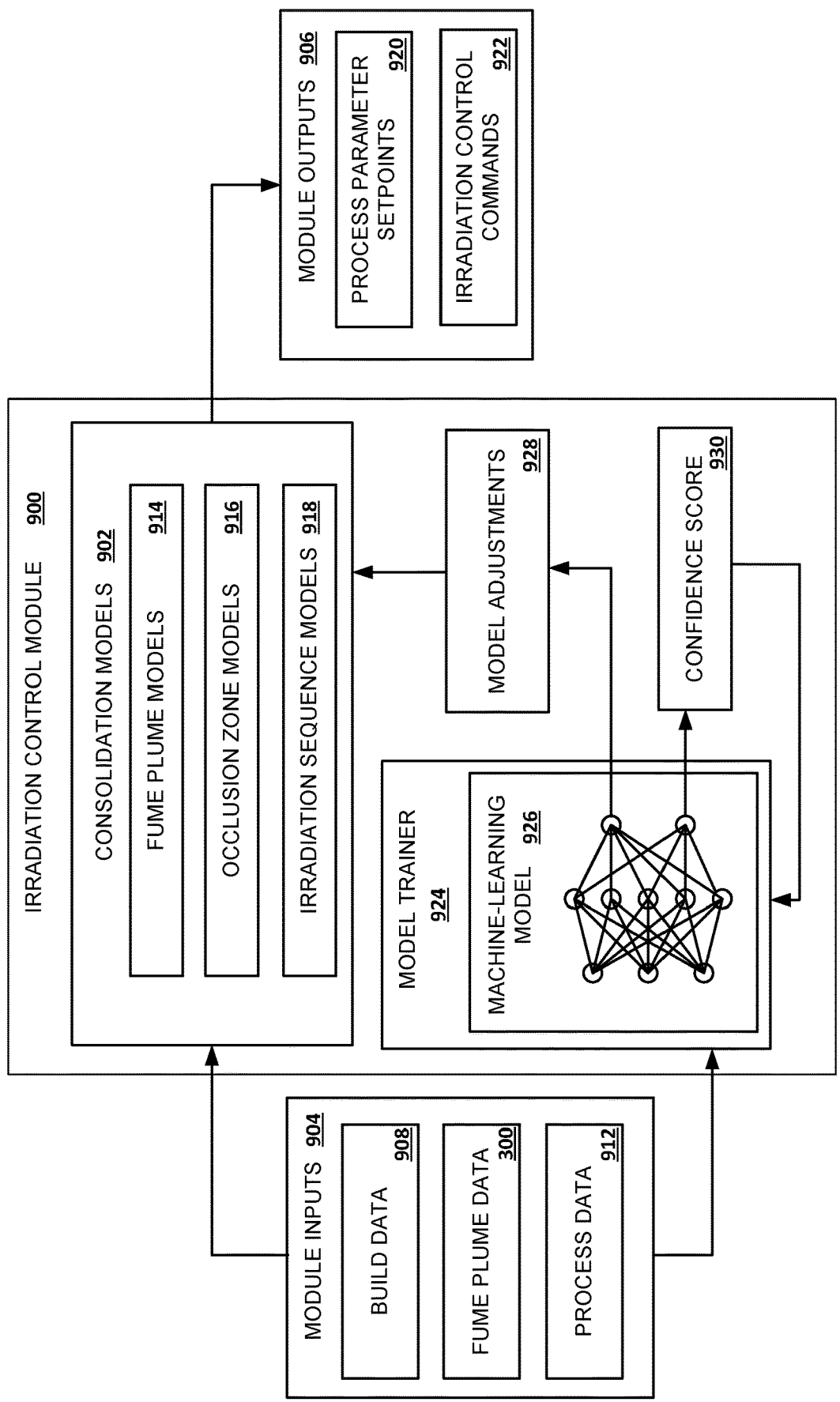
FIG. 9 schematically depicts an exemplary irradiation control module.

Referring now to FIG. 9, an exemplary irradiation control module 900 will be described. As shown in FIG. 9, an irradiation control module 900 may include one or more consolidation models 902. The irradiation control module 900 may be configured to receive one or more model inputs 904. The one or more model inputs 904 may be utilized by the one or more consolidation models 902 to provide one or more model outputs 906. Exemplary model inputs 904 that may be utilized by the one or more consolidation models 902 include build data 908, fume plume data 300, and/or process data 912.

Exemplary build data 908 may include build files, such as CAD files or STL files for an object 114 to be additively manufactured. Such build files may include a two- or three-dimensional representation of an object 114 to be additively manufactured and/or slices of the object 114 corresponding to respective layers 700 to be selectively consolidated by the energy beam system 132. Exemplary fume plume data 300 may include image data 302 representing a region of a process chamber 148 occupied by a fume plume 200 as a function of a duration of irradiation from an energy beam 134, and/or data generated based at least in part on the image data 302. Exemplary process data 912 may include parameters associated with an additive manufacturing machine 102, such as parameters corresponding to the fume plume data 300 and/or to the build data 908. The process data 912 may correspond to previously additively manufactured objects 114 and/or an object to be additively manufactured based at least in part on one or more model outputs 906 generated by the irradiation control module 900. The process data 912 may include consolidation parameters (e.g., irradiation parameters and/or powder material parameters), gas flow parameters, and/or scan vector parameters.

The one or more consolidation models 902 may include one or more fume plume models 914. A fume plume model 914 may be configured to determine a region of a build plane 128 occluded by a fume plume 200, such as a described with reference to FIGS. 4A-4C. For example, a fume plume model 914 may be configured to determine a correlation between the region of the build plane 128 occluded by a fume plume 200 and one or more process conditions associated with an additive manufacturing machine 102. Additionally, or in the alternative, the one or more consolidation models 902 may include one or more occlusion zone models 916. An occlusion zone model 916 may be configured to determine a predicted location of one or more fume plumes 200 emitted from a powder material 118 when irradiated by one or more energy beams 134, such as described with reference to FIGS. 5A and 5B, and/or FIGS. 6A-6C. For example, an occlusion zone model 916 may be configured to determine a location and/or one or more dimensions of an occlusion zone 500 and/or an inert zone 502. The location and/or one or more dimensions of an occlusion zone 500 and/or an inert zone 502 may include one or more occlusion boundaries 504 Additionally, or in the alternative, the one or more consolidation models 902 may include one or more irradiation sequence models 918. An irradiation sequence model 918 may be configured to determine an irradiation sequence, and/or one or more properties thereof, based at least in part on a predicted location of one or more fume plumes 200 emitted from a powder material 118 when irradiated by one or more energy beams 134, such as described with reference to FIGS. 7A-7D. For example, an irradiation sequence, and/or one or more properties thereof, may be determined based at least in part on a fume plume model 914 and/or an occlusion zone model 916. In some embodiments, a consolidation model 902 may include a fume plume model 914, an occlusion zone model 916, and an irradiation sequence model 918.

An irradiation control module 900 may be configured to provide model outputs 906, for example, based at least in part on one or more consolidation models 902. The model outputs 906 may be based at least in part on at least one of:

a fume plume model 914, an occlusion zone model 916, and an irradiation sequence model 918. Exemplary model outputs 906 may include process parameter setpoints 920 and/or irradiation control commands 922. Process parameter setpoints 920 may include setpoints for one or more process parameters associated with an additive manufacturing machine 102, such as setpoints for one or more consolidation parameters (e.g., irradiation parameters), gas flow parameters, and/or scan vector parameters. Irradiation control commands 922 may include control commands configured to cause an additive manufacturing machine 102 to additively manufacture a three-dimensional object 114 based at least in part on the model outputs 906 from the irradiation control module 900. The model outputs 906, such as the irradiation control commands 922 and or the process parameter setpoints 920, may be configured to cause an additive manufacturing machine 102 and/or an energy beam system 132 to perform an irradiation sequence, for example, based at least in part on an irradiation sequence model 918 and/or another consolidation model 902. The irradiation control commands 922 may be provided to one or more controllable components of the additive manufacturing machine 102, such as one or more controllable components of an energy beam system 132, an imaging system 158, an inertization system 160, a positioning system 170, and so forth.

An irradiation control module 900, and/or one or more consolidation models 902, model inputs 904, and/or model outputs 906 corresponding to an irradiation control module 900, may be generated and/or updated, modified, adjusted, or the like from time to time, including, for example, periodically, in connection with a calibration sequence, a change to an additive manufacturing machine 102 or operation thereof, and/or in real-time.

In some embodiments, an irradiation control module 900 may include a model trainer 924. The model trainer 924 may be configured to generate, update, modify, and/or adjust, one or more consolidation models 902, such as a fume plume model 914, an occlusion zone model 916, and/or an irradiation sequence model 918. An exemplary model trainer 924 may use any one or more various training or learning techniques such as backwards propagation of errors, which may include performing truncated backpropagation through time. In some embodiments, supervised training techniques may be used on a set of labeled training data. The model trainer 924 may perform a number of generalization techniques (e.g., weight decays, dropouts, etc.) to improve the generalization capability of the irradiation control module 900 being trained.

An exemplary model trainer 924 may include a machine-learning model 926. The model trainer 924 may utilize one or more model inputs 904 as inputs, including, for example, as inputs to a machine-learning model 926. The model trainer 924 may output one or more model adjustments 928. The model adjustments 928 may include a new consolidation model 902 and/or updates or adjustments to a consolidation model 902, such as updates to settings, values, and/or schedules already included in the consolidation model 902. Additionally, or in the alternative, the model adjustments 928 may include new settings, values, and/or schedules to be included with or substituted for those already included in the consolidation model 902.

A machine-learning model 926 may use any suitable machine learning technique, operating regime, or algorithm. A machine-learning model 926 may be configured to use pattern recognition, computational learning, artificial intelligence, or the like to derive algorithms that allow the machine-learning model 926 to generate and/or update one or more consolidation models 902. A machine-learning model 926 may include an unsupervised or a supervised learning regime, including a semi-supervised learning regime, an active learning regime, a reinforcement learning regime, and/or a representation learning regime. A machine-learning model 926 may utilize neural networks, decision trees, association rules, inductive logic algorithms, cluster analysis algorithms, and the like.

By way of example, the machine-learning model 926 shown in FIG. 9 includes a neural network. However, an exemplary machine-learning model 926 may include any other suitable model, including a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model, a k-means model, and combinations thereof. Even further additional suitable types of machine or statistical learning models are also contemplated. It will also be appreciated that the machine-learning model 926 can use certain mathematical methods alone or in combination with one or more machine or statistical learning models.

In addition to outputting a model adjustment 928, in some embodiments a machine-learning model 926 may output a confidence score 930, which may provide an indication as to a level of confidence attributable to one or more outputs of the machine-learning model 926. The confidence score 930 may be used, for example, to set a margin of error to be used by the irradiation control module 900 in determining a model adjustment 928. For example, in the event of a low confidence score 930 the irradiation control module 900 may account for a more conservative or wide margin for error when determining a model adjustment 928, whereas in the event of a high confidence score 930 the irradiation control module 900 may allow for a more aggressive or narrow margin for error when determining a model adjustment 928.

Now turning to FIG. 10, and exemplary control system 104 will be described. A control system 104 may be configured to perform one or more control operations associated with an additive manufacturing system 100 and/or an additive manufacturing machine 102. The control operations may include generating an irradiation control module 900 and/or one or more consolidation models 902 utilized by an irradiation control module 900. Additionally, or in the alternative, the control operations may include control operations associated with an additive manufacturing machine 102 and/or an additive manufacturing system 100, for example, based at least in part on model outputs 906 from an irradiation control module 900.

Figure 10:
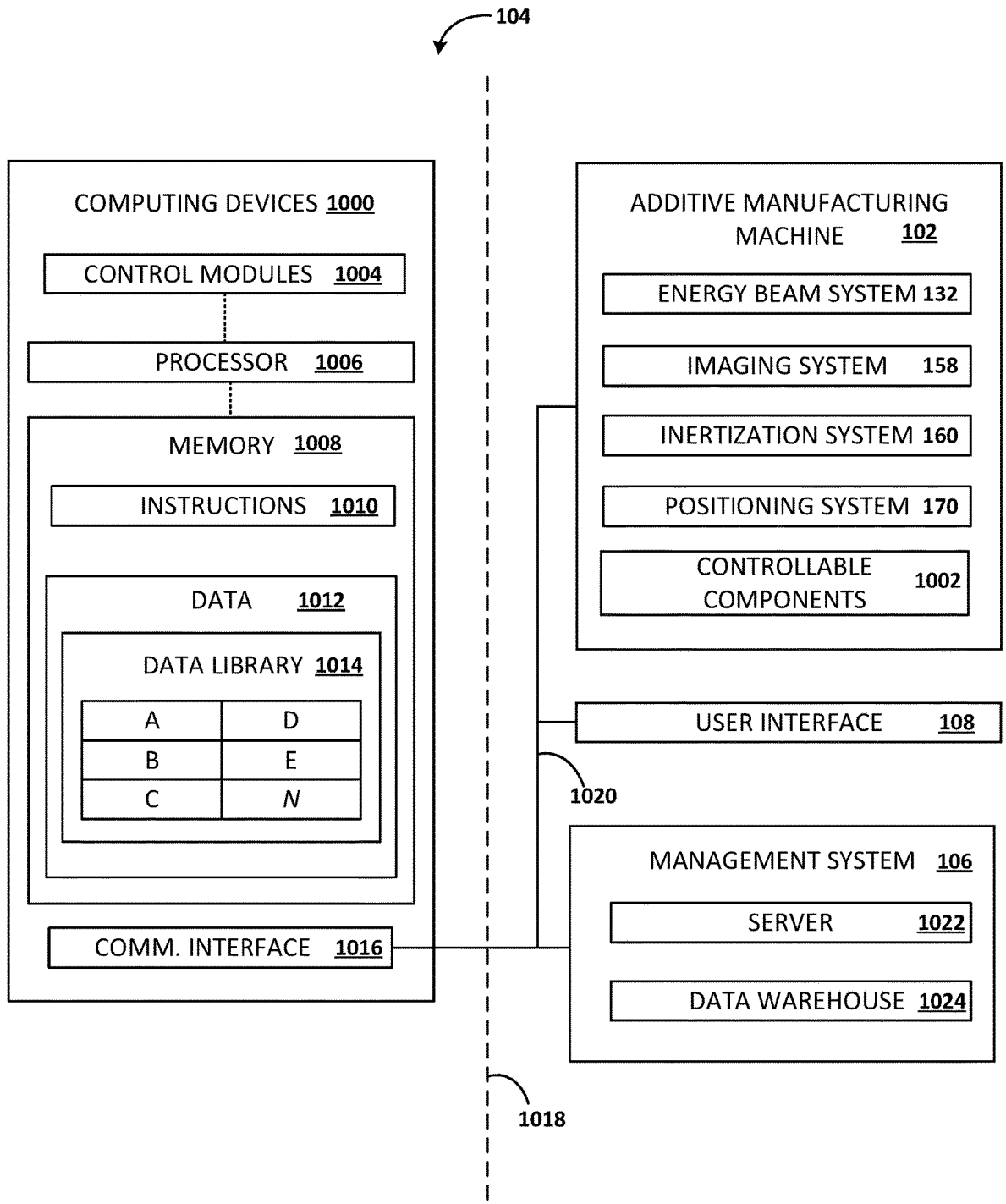
FIG. 10 schematically depicts an exemplary controls system.

As shown in FIG. 10, an exemplary control system 104 may include one or more computing devices 1000. The one or more computing devices 1000 may be communicatively coupled with an additive manufacturing machine 102 and/or additive manufacturing system 100. For example, a computing device 1000 may be communicatively coupled with one or more controllable components 1002 of an additive manufacturing machine 102, such as one or more controllable components 1002 associated with an energy beam system 132, an imaging system 158, an inertization system 160, and/or a positioning system 170. Additionally, or in the alternative, a computing device 1000 may be communicatively coupled with a management system 106 and/or a user interface 108. The one or more computing devices 1000 may be located locally or remotely relative to an additive manufacturing machine 102. In some embodiments, a first computing device 1000 may be configured to generate an irradiation control module 900 and/or one or more consolidation models 902 utilized by an irradiation control module 900, and a second computing device 1000 may be configured to perform control operations associated with an additive manufacturing machine 102 and/or an additive manufacturing system 100, such as based at least in part on model outputs 906 from an irradiation control module 900 generated by the first computing device 1000. Additionally, or in the alternative, the same computing device 1000 may be utilized for these purposes.

The one or more computing devices 1000 may include one or more control modules 1004 configured to cause the computing device 1000 to perform one or more control operations. The one or more control modules 1004 may include one or more irradiation control modules 900. The one or more control modules 1004 may include control logic executable to provide control commands configured to control one or more controllable components 1002 associated with an additive manufacturing machine 102.

The one or more computing devices 1000 may include one or more processors 1006 and one or more memory devices 1008. The one or more processors 1006 may include any suitable processing device, such as a microprocessor, microcontroller, integrated circuit, logic device, and/or other suitable processing device. The one or more memory devices 1008 may include one or more computer-readable media, including but not limited to non-transitory computer-readable media, RAM, ROM, hard drives, flash drives, and/or other memory devices 1008. The one or more control modules 1004 may be implemented at least in part by the one or more processors 1006 and/or the one or more memory devices 1008.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 1008 may include, but is not limited to, a non-transitory computer-readable medium, such as a random-access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 1008 may store information accessible by the one or more processors 1006, including computer-executable instructions 1010 that can be executed by the one or more processors 1006. The instructions 1010 may include any set of instructions which when executed by the one or more processors 1006 cause the one or more processors 1006 to perform operations, including calibration operations, and/or additive manufacturing operations. For example, the instructions 1010 may be configured to cause the one or more processors 1006 to generate an irradiation control module 900 and/or one or more consolidation models 902 utilized by an irradiation control module 900. Additionally, or in the alternative, the instructions 1010 may be configured to cause the one or more processors 1006 to perform control operations associated with an additive manufacturing machine 102 and/or an additive manufacturing system 100, such as based at least in part on model outputs 906 from an irradiation control module 900.

The memory devices 1008 may store data 1012 accessible by the one or more processors 1006, such as fume plume data 300 and/or image data 302. The data 1012 may include current or real-time data 1012, past data 1012, or a combination thereof. The data 1012 may be stored in a data library 1014. As examples, the data 1012 may include data 1012 associated with or generated by an additive manufacturing system 100 and/or an additive manufacturing machine 102, including data 1012 associated with or generated by a computing device 1000, an additive manufacturing machine 102, a management system 106, and/or a user interface 108. The data 1012 may also include other data sets, parameters, outputs, information, associated with an additive manufacturing system 100 and/or an additive manufacturing machine 102.

The one or more computing devices 1000 may also include a communication interface 1016 configured to communicate with various nodes on a communication network 1018 via wired or wireless communication lines 1020. The communication interface 1016 may include any suitable components for interfacing with one or more network(s), including for example, transmitters, receivers, ports, controllers, antennas, and/or other suitable components. The communication interface 1016 may allow the one or more computing devices 1000 to communicate with various nodes associated with the additive manufacturing machine 102, the management system 106, and/or a user interface 108. The communication network 1018 may include, for example, a local area network (LAN), a wide area network (WAN), SATCOM network, VHF network, a HF network, a Wi-Fi network, a WiMAX network, a gatelink network, and/or any other suitable communication network 1018 for transmitting messages to and/or from the computing device 1000 across the communication lines 1020. The communication lines 1020 of communication network 1018 may include a data bus or a combination of wired and/or wireless communication links.

The management system 106 may include a server 1022 and/or a data warehouse 1024. As an example, at least a portion of the data 1012 may be stored in the data warehouse 1024, and the server 1022 may be configured to transmit data 1012 from the data warehouse 1024 to the one or more computing device 1000, and/or to receive data 1012 from the one or more computing devices 1000 and to store the received data 1012 in the data warehouse 1024 for further purposes. The server 1022 and/or the data warehouse 1024 may be implemented as part of the one or more computing devices 1000 and/or as part of the management system 106.

Now turning to FIGS. 11A and 11B, exemplary methods 1100 of, and/or associated with, additively manufacturing a three-dimensional object 114 will be described. By way of example, such exemplary methods may include determining one or more consolidation models 902, determining an irradiation sequence for consolidating one or more layers 700 of powder material 118, and/or additively manufacturing the object 114. Exemplary methods may be performed at least in part by a control system 104, and/or one or more control modules 1004 associated with the control system 104. Additionally, or in the alternative, exemplary methods may be performed at least in part by an additive manufacturing system and/or an additive manufacturing machine 102, for example, by a control system 104 associated therewith.

Figure 11A:
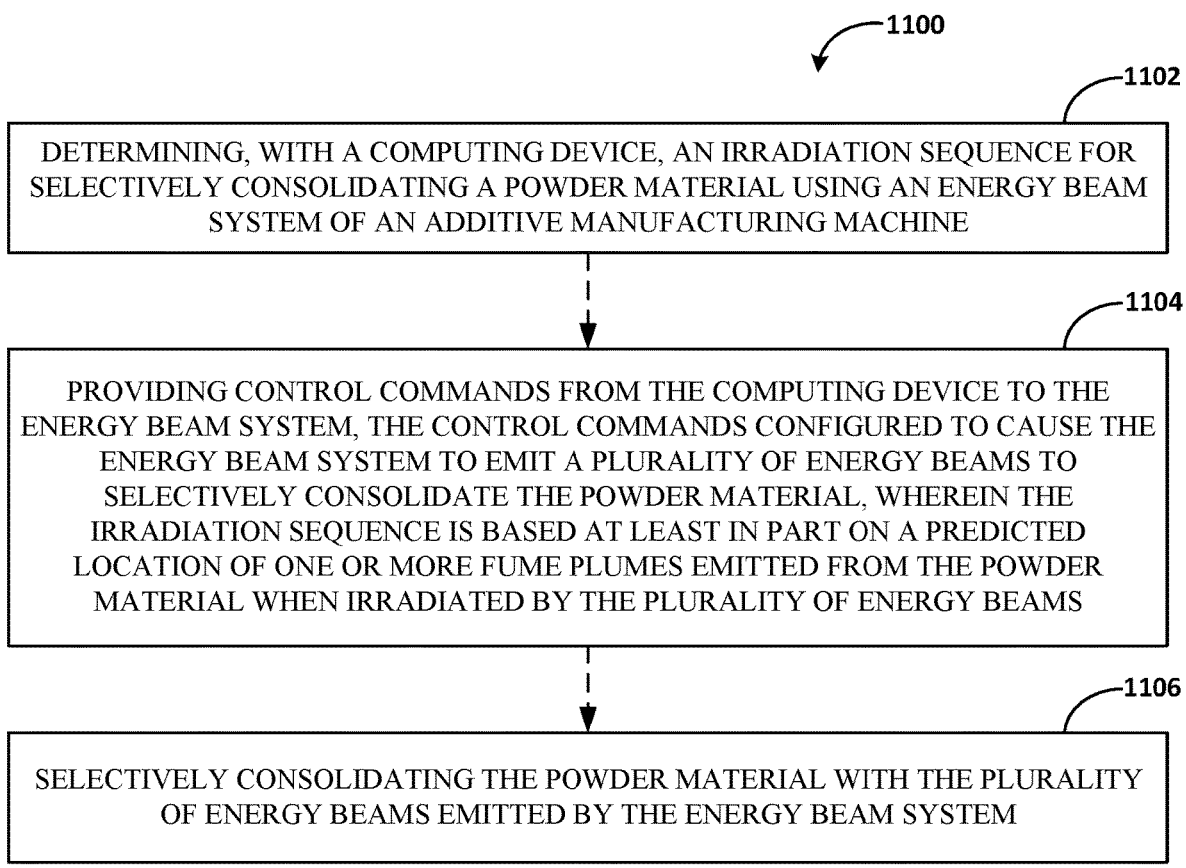
FIG. 11A shows a flow chart depicting an exemplary method of additively manufacturing a three-dimensional object.

By way of example, FIG. 11A shows a flow chart depicting an exemplary method of additively manufacturing a three-dimensional object 114. As shown in FIG. 11A, an exemplary method 1100 may include, at block 1102, determining, with a computing device 1000, an irradiation sequence for selectively consolidating a powder material 118 using an energy beam system 132 of an additive manufacturing machine 102. At block 1104, an exemplary method 1100 may include providing control commands from the computing device 1000 to the energy beam system 132, the control commands configured to cause the energy beam system 132 to emit a plurality of energy beams 134 to selectively consolidate the powder material 118. The irradiation sequence may be based at least in part on a predicted location of one or more fume plumes 200 emitted from the powder material 118 when irradiated by the plurality of energy beams 134. In some embodiments, the exemplary method 1100 may include, at block 1106, selectively consolidating the powder material 118 with the plurality of energy beams 134 emitted by the energy beam system 132.

Figure 11B:
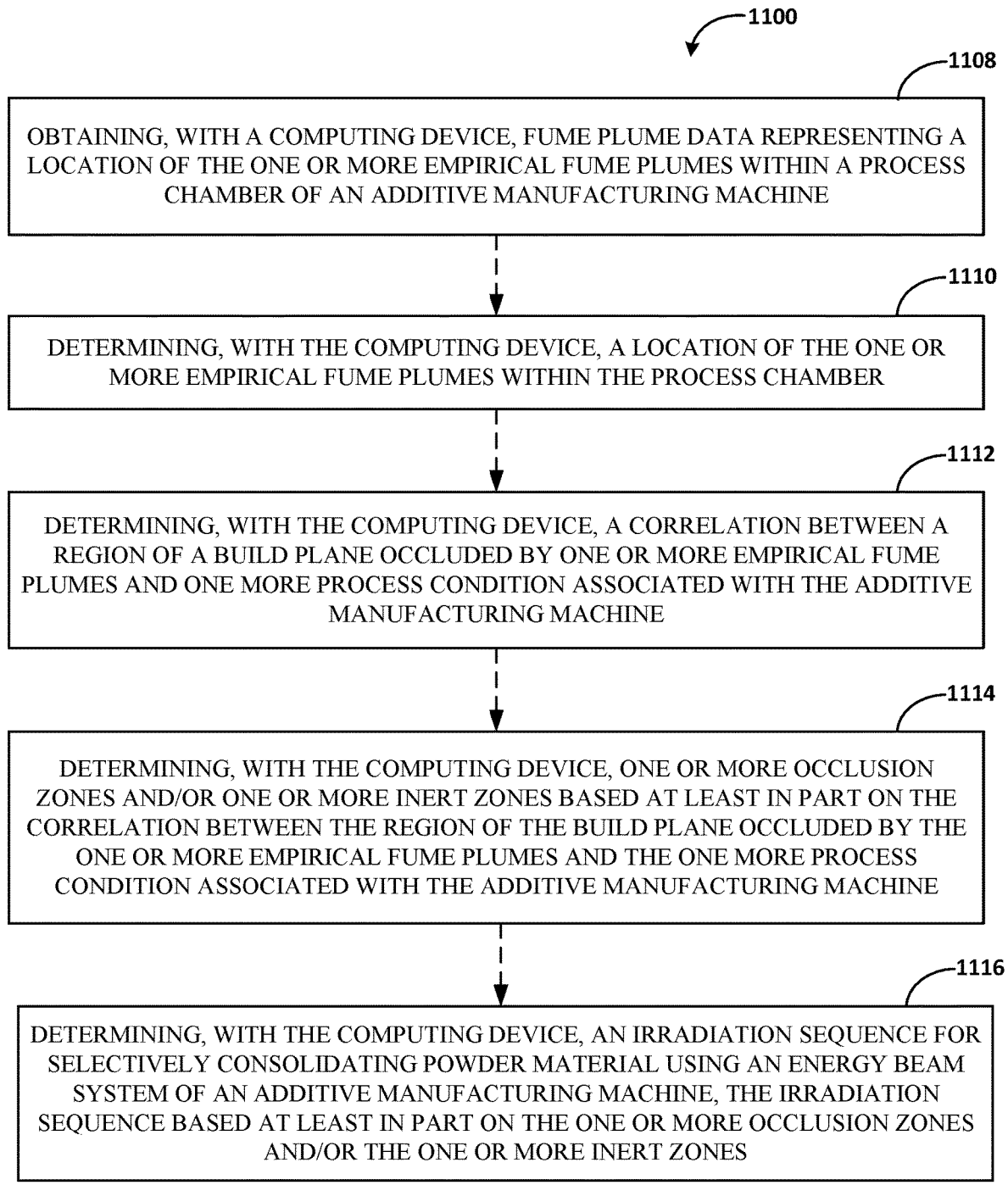
FIG. 11B shows a flow chart depicting an exemplary method of determining an irradiation sequence for selectively consolidating a powder material.

As a further example, FIG. 11B shows a flow chart depicting an exemplary method 1100 of determining an irradiation sequence for selectively consolidating a powder material 118. The method 1100 described with reference to FIG. 11B may be performed together with, and/or independently from, the method 1100 described with reference to FIG. 11A.

As shown in FIG. 11B, an exemplary method 1100 may include, at block 1108, obtaining, with a computing device 1000, fume plume data 300 representing a location of the one or more empirical fume plumes 304 within a process chamber 148 of an additive manufacturing machine 102. The fume plume data 300 may include or may be generated based at least in part on image data 302 captured by an imaging system 158. At block 1110, an exemplary method 1100 may include determining, with the computing device 1000, a location of the one or more empirical fume plumes 304 within the process chamber. At block 1112, an exemplary method 1100 may include determining, with the computing device 1000, a correlation between a region of a build plane 128 occluded by one or more empirical fume plumes 304 and one more process condition associated with the additive manufacturing machine 102. The correlation may be based at least in part on the location of the one or more empirical fume plumes 304 within the process chamber 148.

At block 1114, an exemplary method 1100 may include determining, with the computing device 1000, one or more occlusion zones 500 and/or one or more inert zones 502. The one or more occlusion zones 500 and/or the one or more inert zones 502 may be based at least in part on the correlation between the region of the build plane 128 occluded by the one or more empirical fume plumes 304 and the one more process condition associated with the additive manufacturing machine 102. The one or more occlusion zones 500 and/or the one or more inert zones 502 may define a predicted location of one or more fume plumes 200 emitted from powder material when irradiated by one or more energy beams during an additive manufacturing process. The one or more occlusion zones 500 and/or the one or more inert zones 502 may be defined at least in part by one or more occlusion boundaries 504 delineating an occlusion zone 500 from an inert zone 502. At block 1116, an exemplary method 1100 may include determining, with the computing device 1000, an irradiation sequence for selectively consolidating powder material 118 using an energy beam system 132 of an additive manufacturing machine 102. The irradiation sequence may be based at least in part on the one or more occlusion zones 500 and/or the one or more inert zones 502. Additionally, or in the alternative, the irradiation sequence may be based at least in part on the predicted location of the one or more fume plumes 200 emitted from the powder material 118 when irradiated by the one or more energy beams 134. In some embodiments, the predicted location may include an occlusion zone 500 that represents a region of the build plane 128 predicted to be at least partially occluded by one or more fume plumes 200. The irradiation sequence may be configured to selectively consolidate the powder material 118 with the one or more energy beams 134 avoiding the occlusion zone 500. The occlusion zone 500 may include an aggregate occlusion zone 600 corresponding to one or more fume plumes 200. Additionally, or in the alternative, the occlusion zone 500 may include one or more occlusion boundaries 504 delineating the occlusion zone 500 from an inert zone 502 representing a region of the build plane 128 predicted to be free from occlusion by the one or more fume plumes 200. The one or more occlusion boundaries 504 may include at least one of: an upstream occlusion boundary 506, a downstream occlusion boundary 508, and one or more lateral occlusion boundaries 510.

Further aspects of the presently disclosed subject matter are provided by the following clauses:

A method of additively manufacturing a three-dimensional object, the method comprising: determining, with a computing device, an irradiation sequence for selectively consolidating a powder material using an energy beam system of an additive manufacturing machine; and providing control commands from the computing device to the energy beam system, the control commands configured to cause the energy beam system to emit a plurality of energy beams to selectively consolidate the powder material; wherein the irradiation sequence is based at least in part on a predicted location of one or more fume plumes emitted from the powder material when irradiated by the plurality of energy beams.

The method of any clause herein, comprising: determining, with the computing device, the predicted location based at least in part on a correlation between a region of a build plane occluded by one or more empirical fume plumes and one more process condition associated with the additive manufacturing machine.

The method of any clause herein, comprising: updating, with the computing device, the predicted location based at least in part on the correlation between the region of a build plane occluded by one or more empirical fume plumes and one more process condition associated with the additive manufacturing machine.

The method of any clause herein, comprising: determining, with the computing device, a correlation between a region of a build plane occluded by one or more empirical fume plumes and one more process condition associated with the additive manufacturing machine, wherein the predicted location is determined based at least in part on the correlation.

The method of any clause herein, comprising: updating, with the computing device, the correlation between the region of a build plane occluded by one or more empirical fume plumes and one more process condition associated with the additive manufacturing machine, wherein the predicted location is determined based at least in part on the updated correlation.

The method of any clause herein, comprising: determining, with the computing device, a location of the one or more empirical fume plumes within a process chamber of the additive manufacturing machine, wherein the correlation is based at least in part on the location of the one or more empirical fume plumes within the process chamber.

The method of any clause herein, comprising: updating, with the computing device, the location of the one or more empirical fume plumes within a process chamber of the additive manufacturing machine, wherein the correlation is based at least in part on the updated location of the one or more empirical fume plumes within the process chamber.

The method of any clause herein, comprising: obtaining, with the computing device, fume plume data representing the location of the one or more empirical fume plumes within the process chamber, wherein the fume plume data comprises or is generated based at least in part on image data captured by an imaging system.

The method of any clause herein, comprising: obtaining, with the computing device, updated fume plume data representing the location of the one or more empirical fume plumes within the process chamber, wherein the updated fume plume data comprises or is generated based at least in part on updated image data captured by the imaging system.

The method of any clause herein, wherein the predicted location comprises an occlusion zone, the occlusion zone comprising a region of a build plane predicted to be at least partially occluded by the one or more fume plumes, and wherein the irradiation sequence is configured to selectively consolidate the powder material with the plurality of energy beams avoiding the occlusion zone.

The method of any clause herein, wherein the occlusion zone comprises an aggregate occlusion zone corresponding to a plurality of fume plumes.

The method of any clause herein, wherein the occlusion zone comprises one or more occlusion boundaries, the one or more occlusion boundaries delineating the occlusion zone from an inert zone, the inert zone comprising a region of the build plane predicted to be free from occlusion by the one or more fume plumes.

The method of any clause herein, wherein the one or more occlusion boundaries comprises at least one of: an upstream occlusion boundary; a downstream occlusion boundary; and one or more lateral occlusion boundaries.

The method of any clause herein, wherein the irradiation sequence comprises the plurality of energy beams respectively generating a corresponding plurality of beam spots located upstream from the upstream occlusion boundary, wherein the upstream occlusion boundary transects the one or more lateral occlusion boundaries.

The method of any clause herein, wherein the irradiation sequence comprises a plurality of scan areas, wherein the plurality of scan areas respectively comprises a plurality of patches.

The method of any clause herein, wherein the predicted location depends at least in part on a time and/or a time interval corresponding to the irradiation sequence.

The method of any clause herein, wherein the predicted location comprises an occlusion zone, wherein the occlusion zone comprises a region of a build plane that has at least a 1% likelihood of being at least partially occluded by the one or more fume plumes.

The method of any clause herein, wherein the predicted location comprises an occlusion zone, and wherein beam spots respectively generated by the plurality of energy beams to selectively consolidate the powder material remain outside of the occlusion zone for at least 80% of an irradiation sequence.

The method of any clause herein, wherein the irradiation sequence is configured to selectively consolidate the powder material with the plurality of energy beams remaining within an inert zone comprising a region of a build plane predicted to be free from occlusion by the one or more fume plumes.

The method of any clause herein, wherein the irradiation sequence comprises a utilization efficiency for the energy beam system, wherein the utilization efficiency comprises at least one of: a utilization percentage of at least 75%, wherein the utilization percentage represents a percentage of time when the plurality of energy beams are concurrently consolidating respective portions of a build plane; and a consolidation ratio of from 0.8 to 1.2, wherein the consolidation ratio represent a proportion of consolidation performed by respective ones of the plurality of energy beams determined based on time or energy.

The method of any clause herein, wherein the energy beam system comprises a plurality of irradiation devices, wherein respective ones of the plurality of irradiation devices are configured to emit a corresponding one of the plurality of energy beams.

The method of any clause herein, comprising: irradiating the powder material with the plurality of energy beams emitted by the energy beam system.

The method of any clause herein, comprising: selectively consolidating the powder material with the plurality of energy beams emitted by the energy beam system.

A method of predicting a location of one or more fume plumes emitted from powder material when irradiated by one or more energy beams during an additive manufacturing process, the method comprising: obtaining, with a computing device, fume plume data representing a location of the one or more empirical fume plumes within a process chamber of an additive manufacturing machine; determining, with the computing device, a location of the one or more empirical fume plumes within the process chamber; determining, with the computing device, a correlation between a region of a build plane occluded by one or more empirical fume plumes and one more process condition associated with the additive manufacturing machine; and determining, with the computing device, one or more occlusion zones and/or one or more inert zones based at least in part on the correlation between the region of the build plane occluded by the one or more empirical fume plumes and the one more process condition associated with the additive manufacturing machine.

The method of any clause herein, comprising: updating a predicted location of one or more fume plumes emitted from powder material when irradiated by one or more energy beams during an additive manufacturing process.

A computer-readable medium comprising computer-executable instructions, which when executed by a processor associated with an additive manufacturing machine, causes the processor to perform a method comprising: determining, with a computing device, an irradiation sequence for selectively consolidating a powder material using an energy beam system of an additive manufacturing machine; and providing control commands from the computing device to the energy beam system, the control commands configured to cause the energy beam system to emit a plurality of energy beams to selectively consolidate the powder material; wherein the irradiation sequence is based at least in part on a predicted location of one or more fume plumes emitted from the powder material when irradiated by the plurality of energy beams.

The computer-readable medium of any clause herein, comprising computer-executable instructions, which when executed by a processor associated with an additive manufacturing machine of any clause herein, causes the processor to perform the method of any clause herein.

An apparatus for additively manufacturing three-dimensional objects, the apparatus comprising: a process chamber comprising a build platform configured to support a powder bed comprising a powder material; an energy beam system configured to emit a plurality of energy beams to selectively consolidate the powder material; and a control system configured to provide control commands to the energy beam system, wherein the control commands are configured to cause the energy beam system to emit a plurality of energy beams to selectively consolidate the powder material according to an irradiation sequence having been determined by a computing device; wherein the irradiation sequence is based at least in part on a predicted location of one or more fume plumes emitted from the powder material when irradiated by the plurality of energy beams.

The apparatus of any clause herein, wherein the apparatus is configured to perform the method of any clause herein.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of additively manufacturing a three-dimensional object, the method comprising:
   determining, with a computing device, an irradiation sequence for selectively consolidating a powder material using an energy beam system of an additive manufacturing machine; and
   providing control commands from the computing device to the energy beam system, the control commands configured to cause the energy beam system to emit a plurality of energy beams to selectively consolidate the powder material;
   wherein the irradiation sequence is based at least in part on a predicted location of one or more fume plumes emitted from the powder material when irradiated by the plurality of energy beams, and wherein the predicted location of the one or more fume plumes is based at least in part on a fume plume model.

2. The method of claim 1, comprising:
   determining, with the computing device, the predicted location based at least in part on a correlation between a region of a build plane occluded by one or more empirical fume plumes and one or more process condition associated with the additive manufacturing machine.

3. The method of claim 2, comprising:
   determining, with the computing device, the correlation between the region of the build plane occluded by the one or more empirical fume plumes and the one or more process condition associated with the additive manufacturing machine, wherein the predicted location is determined based at least in part on the correlation.

4. The method of claim 3, comprising:
   determining, with the computing device, a location of the one or more empirical fume plumes within a process chamber of the additive manufacturing machine, wherein the correlation is based at least in part on the location of the one or more empirical fume plumes within the process chamber.

5. The method of claim 4, comprising:
   obtaining, with the computing device, fume plume data representing the location of the one or more empirical fume plumes within the process chamber, wherein the fume plume data comprises or is generated based at least in part on image data captured by an imaging system.

6. The method of claim 1, wherein the predicted location comprises an occlusion zone, the occlusion zone comprising a region of a build plane predicted to be at least partially occluded by the one or more fume plumes, and wherein the irradiation sequence is configured to selectively consolidate the powder material with the plurality of energy beams avoiding the occlusion zone.

7. The method of claim 6, wherein the occlusion zone comprises an aggregate occlusion zone corresponding to a plurality of fume plumes.

8. The method of claim 6, wherein the occlusion zone comprises one or more occlusion boundaries, the one or more occlusion boundaries delineating the occlusion zone from an inert zone, the inert zone comprising a region of the build plane predicted to be free from occlusion by the one or more fume plumes.

9. The method of claim 8, wherein the one or more occlusion boundaries comprises at least one of:
   an upstream occlusion boundary;
   a downstream occlusion boundary;
   one or more lateral occlusion boundaries;
   an upper occlusion boundary; and
   a lower occlusion boundary.

10. The method of claim 9, wherein the irradiation sequence comprises the plurality of energy beams respectively generating a corresponding plurality of beam spots located upstream from the upstream occlusion boundary, wherein the upstream occlusion boundary transects the one or more lateral occlusion boundaries.

11. The method of claim 1, wherein the irradiation sequence comprises a plurality of scan areas, wherein the plurality of scan areas respectively comprises a plurality of patches.

12. The method of claim 1, wherein the predicted location depends at least in part on a time and/or a time interval corresponding to the irradiation sequence.

13. The method of claim 1, wherein the predicted location comprises an occlusion zone, wherein the occlusion zone comprises a region of a build plane that has at least a 1% likelihood of being at least partially occluded by the one or more fume plumes.

14. The method of claim 1, wherein the predicted location comprises an occlusion zone, and wherein beam spots respectively generated by the plurality of energy beams to selectively consolidate the powder material remain outside of the occlusion zone for at least 80% of an irradiation sequence.

15. The method of claim 1, wherein the irradiation sequence is configured to selectively consolidate the powder material with the plurality of energy beams remaining within an inert zone comprising a region of a build plane predicted to be free from occlusion by the one or more fume plumes.

16. The method of claim 1, wherein the irradiation sequence comprises a utilization efficiency for the energy beam system, wherein the utilization efficiency comprises at least one of:
  a utilization percentage of at least 75%, wherein the utilization percentage represents a percentage of time when the plurality of energy beams are concurrently consolidating respective portions of a build plane; and
  a consolidation ratio of from 0.8 to 1.2, wherein the consolidation ratio represents a proportion of consolidation performed by respective ones of the plurality of energy beams determined based on time or energy.

17. The method of claim 1, wherein the energy beam system comprises a plurality of irradiation devices, wherein respective ones of the plurality of irradiation devices are configured to emit a corresponding one of the plurality of energy beams.

18. The method of claim 1, comprising:
  irradiating the powder material with the plurality of energy beams emitted by the energy beam system.

19. A non-transitory computer-readable medium comprising computer-executable instructions, which when executed by a processor associated with an additive manufacturing machine, causes the processor to perform a method comprising:
  determining, with a computing device, an irradiation sequence for selectively consolidating a powder material using an energy beam system of an additive manufacturing machine; and
  providing control commands from the computing device to the energy beam system, the control commands configured to cause the energy beam system to emit a plurality of energy beams to selectively consolidate the powder material;
  wherein the irradiation sequence is based at least in part on a predicted location of one or more fume plumes emitted from the powder material when irradiated by the plurality of energy beams, and wherein the predicted location of the one or more fume plumes is based at least in part on a fume plume model.

* * * * *